United States Patent
Asada et al.

[11] Patent Number: 5,745,533
[45] Date of Patent: Apr. 28, 1998

[54] APPARATUS AND METHOD FOR ADJUSTING THE SKEW OF A TIMING SIGNAL USING PROPAGATION DELAY TIME OF SIGNALS GENERATED BY A RING OSCILLATOR FORMING A DIGITAL CIRCUIT

[75] Inventors: Yoshimi Asada; Tatsumi Nakada, both of Kawasaki, Japan

[73] Assignee: Fujitsu Limited, Kawasaki, Japan

[21] Appl. No.: 452,539

[22] Filed: May 30, 1995

[30] Foreign Application Priority Data

Jun. 2, 1994 [JP] Japan ................................. 6-120854

[51] Int. Cl.$^6$ ............................................. H04L 7/00
[52] U.S. Cl. ........................... 375/354; 371/1; 327/161; 395/558; 340/825.61; 340/825.2
[58] Field of Search ........................... 375/354, 371, 375/377, 376; 371/1; 327/141, 161, 156, 144; 395/551, 553, 559, 558, 556; 326/93, 96; 340/825.05, 825.14, 825.2, 825.57, 825.61

[56] References Cited

U.S. PATENT DOCUMENTS 5,369,640  11/1994  Watson et al. ................. 371/1
5,515,403   5/1996  Sloan et al. ................... 375/371

Primary Examiner—Wellington Chin
Assistant Examiner—William Luthes
Attorney, Agent, or Firm—Staas & Halsey

[57] ABSTRACT

When a selector selects a first input terminal, a first loop circuit is formed including first and second input buffer circuits and an output buffer circuit. When the selector selects a second input terminal, a second loop circuit is formed including the first input buffer circuit and the output buffer circuit. When the selector selects a third input terminal, a third loop circuit is formed including the first input buffer circuit, a variable delay line (VDL), and the output buffer circuit. From the oscillating frequencies of loop circuits each formed as a ring oscillator, their respective signal delay times are obtained. By equalizing characteristics of first and second input buffer circuits, through a mutual operation using the signal delay times of respective loop circuits, a propagation delay time over a timing signal supply path including the first input buffer circuit and the VDL and stretching to a flip-flop is obtained precisely.

25 Claims, 14 Drawing Sheets

APPARATUS AND METHOD FOR ADJUSTING THE SKEW OF A TIMING SIGNAL USING PROPAGATION DELAY TIME OF SIGNALS GENERATED BY A RING OSCILLATOR FORMING A DIGITAL CIRCUIT

BACKGROUND OF THE INVENTION

1. Field of the Invention

This invention relates to an apparatus for adjusting a propagation delay time of a timing signal for use in a digital circuit, and more specifically to a skew adjustment apparatus for a high speed clock signal.

2. Description of the Related Arts

Recently, the operating speeds of digital circuits have been increased to remarkable rates. A digital system and a computer system using a VLSI (very large scale integration) components made of CMOS (complementary metal oxide semiconductor) type components, have already begun to operate with clock signals having frequencies in excess of fifty megahertz [50 MHz].

In such digital circuits, various timing signals are often generated based on a high speed clock signal and supplied together with a clock signal to respective circuit elements. Consequently, the faster a clock signal becomes, the higher the frequency of a timing signal tends to be.

Generally, a digital system and a computer system provide modular units for a circuit for generating a timing signal such as a clock signal, which is independent of other circuit modules operated by the timing signals. Thus, establishing a method for distributing a timing signal such as a clock signal becomes an important issue. Especially important is the precise synchronization of the timing signals supplied to the respective circuit modules that require them.

For this purpose, it is necessary to match the duration of time from the moment a timing signal is generated to the moment it arrives at a plurality of circuit elements using a timing signal in the same phase. However, some variation in the characteristics of circuit elements attributable to their manufacturing processes is unavoidable. It is also difficult to ensure at the design stage the precise match of timing the arrival of the timing signals, due to such factors as a variation in unit-length electrostatic capacitances of wiring materials used inside and outside of a module, and differences in wiring lengths.

Hence, a skew adjustment mechanism is often provided for minimizing a variation (a skew) in the duration of time from the moment at which a timing signal is generated to the moment at which it arrives at a plurality of circuit elements, during or after a circuit manufacturing process.

In recent years when clock signal cycle times become ever shorter because of a need for higher frequencies, skew adjustment over signal supply paths for various timing signals, from their origins to the respective circuit elements for receiving them has become ever more important. This is because minuscule variations in the arrival times of timing signals, which did not present a major problem when clock cycles were comparatively long, cannot be tolerated when clock cycles are short. If such variations in arrival times cannot be ignored, further increases in clock signal frequencies for attaining high performance digital circuits become difficult. Consequently, further increases in clock signal frequencies for attaining high performance digital circuits require a mechanism for more precisely adjusting skew over various timing signal supply paths.

Because a clock signal, inter alia, is representative timing signal inputted to many circuit elements in a system, it is basically necessary to design circuits and transmission paths of a clock supply system, such that a clock signal arrives simultaneously at all circuit elements using a clock signal in the same phase. For this purpose, various skew adjustment circuits have been incorporated into the supply paths of a clock signal at the design stage.

A prior art regarding the skew adjustment of a clock signal includes a method for adjusting the propagation delay time of a clock signal by adding a return path of a clock signal to those clock supply paths necessary in an ordinary operating mode of a digital circuit, and by using this return path in a skew adjustment mode.

FIG. 1 is a block diagram illustrating a conventional skew adjustment circuit.

A conventional digital system shown in FIG. 1 comprises a clock distribution module 11 having a clock oscillator 13 and circuit modules 12-1, 12-2 and 12-3 for receiving a clock signal supplied from the clock distribution module 11. Each of the circuit modules 12-1, 12-2 and 12-3 corresponds to one LSI (large scale integration) chip.

Circuit module 12-1 has flip-flops (FF's) 20-1, 20-2 and 20-3 operating upon an input of a clock signal generated by a clock oscillator 13. A clock supply path 14 stretching from the clock oscillator 13 to flip-flop 20-1 passes through a selector 23, a variable delay line (VDL) 16-1, an output buffer circuit 17-1, an input buffer circuit 18, buffers 19-1 and 19-2, and an inter-module wiring between an output terminal of output buffer circuit 17-1 and an input terminal of the input buffer circuit 18. On the other hand, a clock supply path stretching to flip-flop 20-2 passes through selector 23, VDL 16-1, output buffer circuit 17-1, input buffer circuit 18, buffers 19-1 and 19-3, and the inter-module wiring between the output terminal of output buffer circuit 17-1 and the input terminal of input buffer circuit 18. Further, a clock supply path stretching to flip-flop 20-3 passes through selector 23, VDL 16-1, output buffer circuit 17-1, input buffer circuit 18, buffers 19-4 and 19-5, and the inter-module wiring between the output terminal of output buffer circuit 17-1 and the input terminal of the input buffer circuit 18.

As well, a clock distribution module 11 outputs a clock signal to circuit module 12-2 via selector 23, VDL 16-2, and an output buffer circuit 17-2. It also outputs a clock signal to circuit module 12-3 via selector 23, VDL 16-3, and an output buffer circuit 17-3. Each of circuit modules 12-2 and 12-3 also has digital circuits [equivalent to flip-flops (FF's) 20-1, 20-2 and 20-3] operating upon an input of a clock signal generated by a clock oscillator 13.

A return path 15 is a circuit provided for making a ring oscillator. It comprises an output buffer circuit 21, an input buffer circuit 22, and an inter-module wiring between an output terminal of output buffer circuit 21 and an input terminal of input buffer circuit 22. As with circuit module 12-1, each of circuit modules 12-2 and 12-3 comprises an output buffer circuit for providing a return path (not shown) to clock distribution module 11. Selector 23 switches among respective signals from these return paths and a clock signal from the clock oscillator 13.

Explained below is an operation of the digital system shown in FIG. 1.

In an ordinary operating mode, a control signal (not shown) has selector 23 select an input terminal b for connection to an output side. As a result, selector 23 causes the clock signal generated by the clock oscillator 13 to be outputted via VDL's 16-1, 16-2 and 16-3 as well as output buffer circuits 17-1, 17-2 and 17-3 to circuit modules 12-1, 12-2 and 12-3.

Circuit module 12-1 supplies the inputted clock signal to a clock input terminal of flip-flop 20-1 via input buffer circuit 18 and buffers 19-1 and 19-2. It also supplies the same to a clock input terminal of flip-flop 20-2 via input buffer circuit 18 and buffers 19-1 and 19-3. It further supplies the same to a clock input terminal of flip-flop 20-3 via the input buffer circuit 18 and buffers 19-4 and 19-5. Flip-flops 20-1, 20-2 and 20-3 perform respective operations according to their supplied clock signals. Circuit modules 12-2 and 12-3 operate in the same way as circuit module 12-1.

In a skew adjustment mode for adjusting a propagation delay time of the clock signal, the control signal has selector 23 select an input terminal a for connection to an output side. As a result, selector 23 does not cause the clock signal generated by the clock oscillator 13 to be outputted via VDL 16-1. Instead, selector 23 now causes an output terminal of the input buffer circuit 22 to be connected to an input terminal of VDL 16-1. Hence, the return path 15 and the clock supply path 14 form a circuit (a ring oscillator) in the form of a closed loop, which generates a pulse having a frequency corresponding to a signal delay time on the formed loop. The pulse frequency is regarded as a parameter of a propagation delay time of the clock signal with regard to circuit module 12-1.

In the skew adjustment mode, circuit modules 12-2 and 12-3 also obtain their oscillating frequencies by connecting respective return paths to respective clock supply paths, and thereby forming ring oscillators, respectively. At this time, the selection signal has selector 23 select another input terminal (not shown) for connection to an output side. Adjustments of propagation delay times by VDL's provided on respective clock supply paths, such that the oscillating frequencies of ring oscillators obtained for respective circuit modules match, enable three circuit modules 12-1, 12-2 and 12-3 to remove any skew in the clock signal.

The skew adjustment circuit shown in FIG. 1 enables VDL's to calibrate any variation in propagation delay times of a clock signal, due to factors such as variations in characteristics of circuit elements and wiring materials forming clock supply paths, based on a measured frequency of a ring oscillator comprising a clock supply path and a return path.

Yet, the conventional skew adjustment method such as one described above has a problem that VDL's include in their means of adjustment propagation delay times over return paths not actually used as transmission paths of a clock signal in the ordinary operating mode. That is, each of a wiring over the return path 15, output buffer circuit 21 for driving the wiring part and input buffer circuit 22, the last of which is an input buffer of a clock distribution module, all necessary for forming a ring oscillator, introduces a signal delay. The skew adjustment circuit shown in FIG. 1 has each of the VDL's 16-1, 16-2 and 16-3 perform an adjustment, such that all the circuit modules 12-1, 12-2 and 12-3 have the same oscillating frequency corresponding to the sum total of a propagation delay time over the clock supply path 14 and a propagation delay time of the above elements necessary for forming a ring oscillator.

A propagation delay time of a wiring of the return path 15, i.e. a wiring between an output terminal of output buffer circuit 21 and an input terminal of input buffer circuit 22 can be set to have a minimum variation by designing that the circuit modules 12-1, 12-2 and 12-3 have an equal wiring length. However, inasmuch as output buffer circuit 21 and input buffer circuit 22 are composed of semiconductor circuit elements, a variation in propagation delay times of respective circuit modules due to the difference in their characteristics is comparatively large. Especially, because output buffer circuit 21 is a buffer having a high driving power for driving a wiring, there will be a considerable variation in semiconductor characteristics between individual circuit elements. Hence, since a variation in propagation delay times over return paths of respective circuit modules affects the oscillating frequencies of ring oscillators, even if all the circuit modules have the same oscillating frequency, a conventional skew adjustment method is unable to produce precisely the same propagation delay times over respective clock supply paths of circuit modules even after propagation delay time adjustments have been made.

Because today's digital circuits having clock frequencies in excess of fifty megahertz [50 MHz] often have such signal delay times attributable to return paths at levels that cannot be ignored for clock cycles, a conventional skew adjustment method is often incapable of matching propagation delay times over clock supply paths among a plurality of circuit modules. Thus, future development of digital circuits operating at even higher frequency clock signals is dependent on a precise adjustment of a skew of a propagation delay time over supply paths of clock signals and various timing signals generated.

SUMMARY OF THE INVENTION

This invention aims at providing an apparatus and a method for precisely adjusting the skew of a propagation delay time of a timing signal having a high frequency of about three hundred megahertz [300 MHz], thereby solving the above mentioned problem for digital circuits.

The skew adjustment means of this invention for use in an adjustment process for the signal delay time over a timing signal supply path for supplying a timing signal to a digital circuit, comprise a step of forming a first loop circuit including a first delay circuit and a variable delay line on the timing signal supply path, and a second delay circuit not on the timing signal supply path, a step of obtaining a propagation delay time of the first loop circuit from a first pulse received from the first loop circuit, a step of forming a second loop circuit including the first and second delay circuits but excluding the variable delay line, a step of obtaining a propagation delay time of the second loop circuit from a second pulse received from the second loop circuit, and a step of adjusting the signal delay time over the timing signal supply path, by changing a propagation delay time of the variable delay line, based on a propagation delay time of the first loop circuit and a propagation delay time of the second loop circuit.

In a second aspect of this invention the skew adjustment methods for use in an adjustment process of the signal delay time over a timing signal supply path for supplying a timing signal to a digital circuit, comprise a step of forming a first loop circuit including a first delay circuit, a variable delay line on the timing signal supply path, and a second delay circuit not on the timing signal supply path, a step of obtaining a propagation delay time of the first loop circuit from a first pulse received from the first loop circuit, a step of forming a second loop circuit including the first and second delay circuits, the variable delay line and a third delay circuit, having a propagation delay time equivalent to that of a first delay circuit, not provided on the timing signal supply path, a step of obtaining a propagation delay time of the second loop circuit from a second pulse received from the second loop circuit, and a step of adjusting the signal delay time of the timing signal supply path by changing a propagation delay time of the variable delay line, based on a propagation delay time of the first loop circuit and a propagation delay time of the second loop circuit.

In a third aspect of this invention the skew adjustment methods for use in an adjustment process for the signal delay time of a timing signal supply path for supplying a timing signal to a digital circuit, comprise a step of forming a first loop circuit from the timing signal supply path and return path, a step of obtaining a propagation delay time of the first loop circuit from a first pulse received from the first loop circuit, a step of forming a second loop circuit by using the return path, a step of obtaining a propagation delay time of the second loop circuit from a second pulse received from the second loop circuit, a step of obtaining the signal delay time of the timing signal supply path by using a propagation delay time of the first loop circuit and a propagation delay time of the second loop circuit and a step of adjusting the signal delay time of the timing signal supply path, based on the obtained signal delay time of the timing signal supply path.

The skew adjustment apparatus of this invention for use in a digital system having a timing signal supply path for supplying a timing signal to a digital circuit, comprises a first delay unit provided on the timing signal supply path, a propagation delay time adjustment unit provided on the timing signal supply path, a second delay unit connected to an output terminal of the propagation delay time adjustment unit and an input terminal of the first delay unit, and a selection unit for selectively forming either of a first loop circuit including the first and second delay units and the propagation delay time adjustment unit, and a second loop circuit including the first and second delay units but excluding the propagation delay time adjustment unit.

In a second aspect of this invention, the skew adjustment apparatus for use in a digital system having a plurality of timing signal supply paths for supplying a timing signal to digital circuits, comprises for each timing signal supply path: a first delay unit provided on each of the plurality of timing signal supply paths, a propagation delay time adjustment unit provided on each of the plurality of timing signal supply paths, a second delay unit connected between an output terminal of the propagation delay time adjustment unit, and an input terminal of the first delay unit and a selection unit for selectively forming either of a first loop circuit including the first and second delay units and the propagation delay time adjustment unit, and a second loop circuit including the first and second delay units but excluding the propagation delay time adjustment unit.

In a third aspect of this invention the skew adjustment apparatus for use in a digital system having a timing signal generation circuit for generating a timing signal and a timing signal supply path for transferring the timing signal, comprises a propagation delay time adjustment unit provided on the timing signal supply path, a first delay unit provided on the timing signal supply path, a first return path connected to the timing signal supply path, a second delay unit provided on the first return path, a second return path connected to the first return path, a third delay unit having a propagation delay time equivalent to that of the second delay unit, provided on the second return path and a selection unit for selectively forming either of a first loop circuit including the first and second delay units and the propagation delay time adjustment unit but excluding the third delay unit, and a second loop circuit including the first, second, third delay units and the propagation delay time adjustment unit.

In a fourth aspect of this invention the skew adjustment apparatus for use in a digital system having a timing signal generation circuit for generating a timing signal and a plurality of timing signal supply paths for transferring the timing signal, comprises for each timing signal supply path a propagation delay time adjustment unit provided on each of the plurality of timing signal supply paths, a first delay unit provided on each of the plurality of timing signal supply paths, a first return path connected to each of the plurality of timing signal supply paths, a second delay unit provided on the first return path, a second return path connected to the first return path, a third delay unit, having a propagation delay time equivalent to that of the second delay unit, provided on the second return path, and a selection unit for selectively forming either of a first loop circuit including the first and second delay units and the propagation delay time adjustment unit but excluding the third delay unit, and a second loop circuit including the first, second and third delay units and the propagation delay time adjustment unit.

In a fifth aspect of this invention the skew adjustment apparatus for use in a digital system having a timing signal supply path for supplying a timing signal to a digital circuit, comprises a variable delay line provided on the timing signal supply path, a first input buffer circuit provided on the timing signal supply path, a first return path connected to the timing signal supply path, an output buffer circuit provided on the first return path, a second return path connected to the timing signal supply path, a second input buffer circuit, having a propagation delay time equivalent to that of the first input buffer circuit, provided on the second return path, and a selector for selectively forming any of a first loop circuit including the first input buffer circuit, the variable delay line and the output buffer circuit, a second loop circuit including the first input buffer circuit and the output buffer circuit but excluding the second input buffer circuit and the variable delay line, and a third loop circuit including the first and second input buffer circuits and the output buffer circuit but excluding the variable delay line.

In a sixth aspect of this invention the skew adjustment apparatus for use in a digital system having a timing signal generation circuit for generating a timing signal and a timing signal supply path for transferring the timing signal, comprises a variable delay line provided on the timing signal supply path, an output buffer circuit provided on the timing signal supply path, a first return path connected to the timing signal supply path, a first input buffer circuit provided on the first return path, a second return path connected to the first return path, a second input buffer circuit having a propagation delay time equivalent to that of the first input buffer circuit provided on the second return path, and a selector for selectively forming either of a first loop circuit including the output buffer circuit, the first input buffer circuit and the variable delay line but excluding the second input buffer circuit, and a second loop circuit including the output buffer circuit, the first and second input buffer circuits and the variable delay line.

In a seventh aspect of this invention the skew adjustment apparatus for use in a digital system having a plurality of timing signal supply paths for supplying a plurality of timing signals to digital circuits, comprises for each timing signal supply path a variable delay line provided on each of the plurality of timing signal supply paths, a first input buffer circuit provided on each of the plurality of timing signal supply paths, a first return path connected to each of the plurality of timing signal supply paths, an output buffer circuit provided on the first return path, a second return path connected to each of the plurality of timing signal supply paths, a second input buffer circuit having a propagation delay time equivalent to that of the first input, a buffer circuit provided on the second return path, and a selector for selectively forming either of a first loop circuit including the first input buffer circuit and the variable delay line and the output buffer circuit, a second loop circuit including the first input buffer circuit and the output buffer circuit but excluding the second input buffer circuit and the variable delay line, and a third loop circuit including the first and second input buffer circuits and the output buffer circuit but excluding the variable delay line.

In an eighth aspect of this invention the skew adjustment apparatus for use in a digital system having a timing signal supply path for supplying a timing signal to a digital circuit, comprises a variable delay line provided on the timing signal supply path, an input buffer circuit provided on the timing signal supply path, a first return path connected to the timing signal supply path, an output buffer circuit provided on the first return path, a second return path connected to the timing signal supply path, and a selector for selectively forming either of a first loop circuit including the input buffer circuit, the variable delay line and the an output buffer circuit, and a second loop circuit including the an output buffer circuit but excluding the input buffer circuit and the variable delay line.

It must be noted here that a skew adjustment apparatus of this invention operates simultaneously as a propagation delay time measurement apparatus. That is, the apparatus of this invention comprises at least two closed loop circuits. Of these two closed loop circuits, only one includes a circuit whose propagation delay time is being measured (i.e. a timing signal supply path being measured), the other does not.

Further, these two closed loop circuits share loop circuit paths, except parts such as a circuit whose propagation delay time is being measured. Then, respective loops produce pulses each having a predetermined relationship with the propagation delay time of a corresponding loop. Thus, pulses of these two closed loop circuits allow respective propagation delay times to be obtained. A calculation of the difference between these two closed loop circuits allows a propagation delay time of a necessary circuit part to be obtained.

Because the above described skew adjustment method or apparatus enables the signal delay time over a timing signal supply path being measured to be obtained easily and precisely by using the signal delay time over a closed loop circuit including the timing signal supply path and one over a closed loop circuit excluding the same, this invention enables a skew over a timing signal supply path to be precisely adjusted. Accordingly, it is effective in solving the problem of expediting the development of digital circuits using high frequency timing signals.

BRIEF DESCRIPTION OF THE DRAWINGS

One of an ordinary skill in the art may easily understand additional features and objects of this invention from the description of the preferred embodiments and the attached drawings.

Referring to the drawings.

DETAILED DESCRIPTION OF THE PREFERRED EMBODIMENTS

Figure 1:
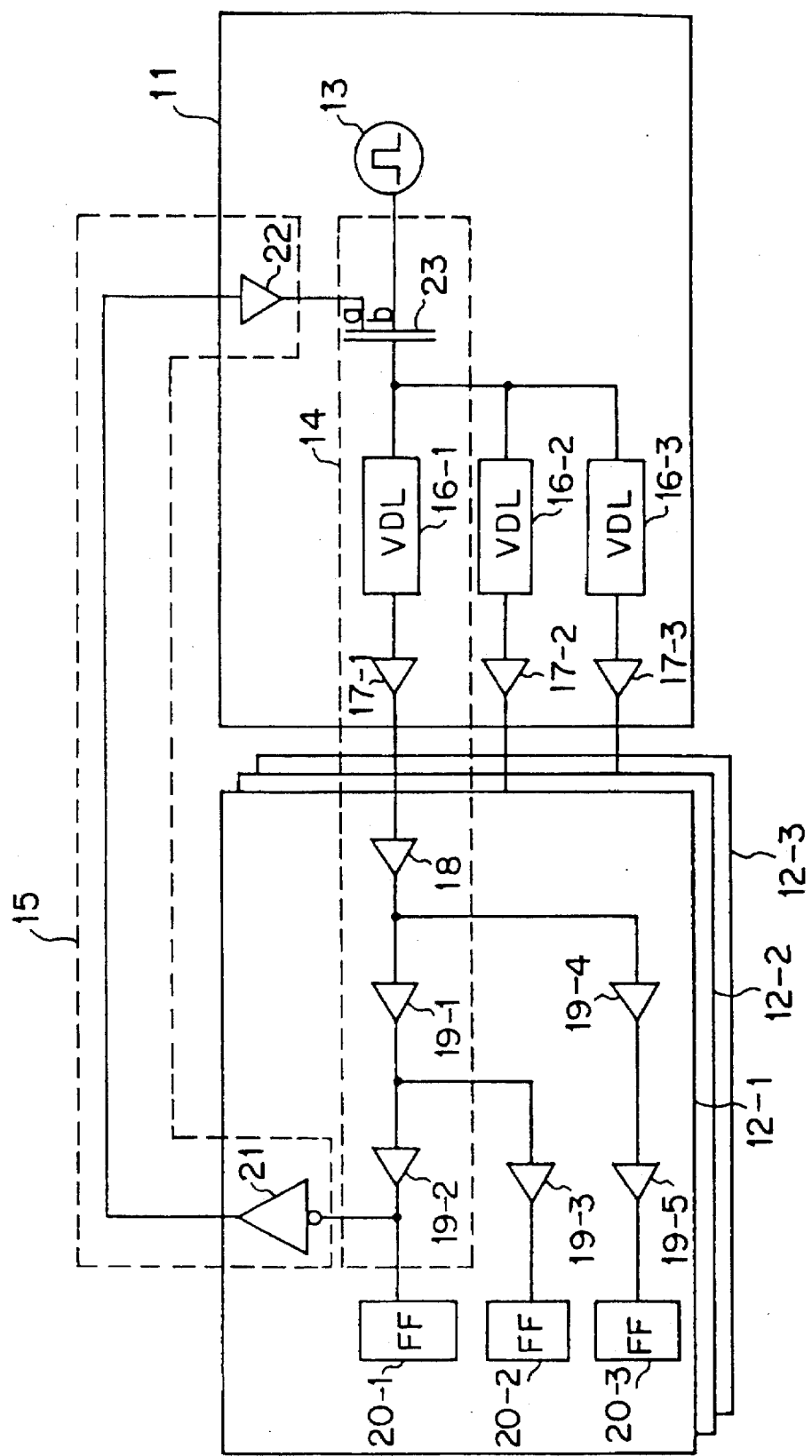
FIG. 1 is a block diagram illustrating a conventional skew adjustment circuit.
Figure 2:
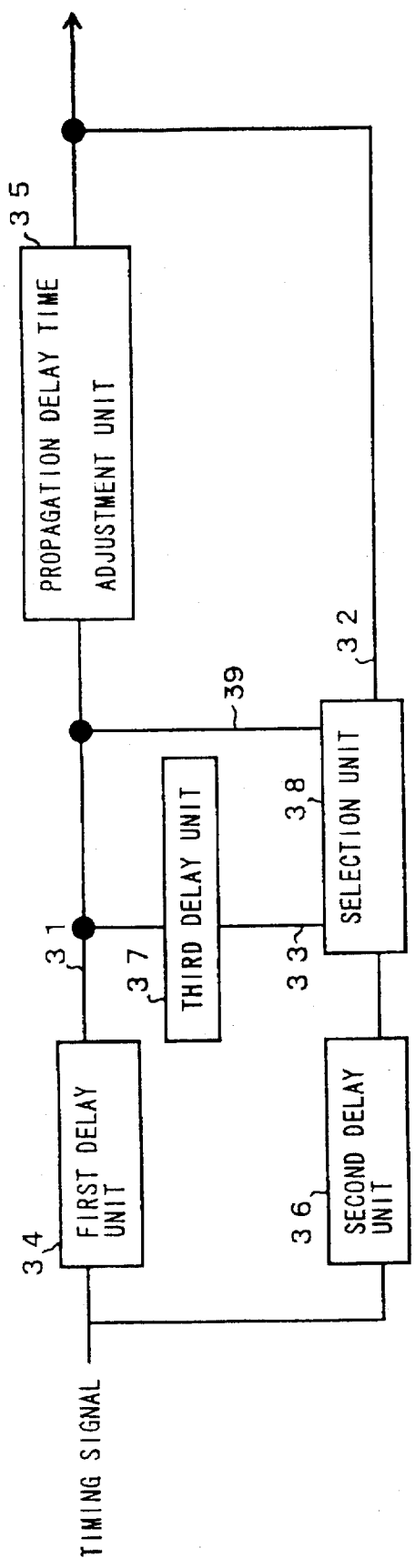
FIG. 2 is a block diagram illustrating a basic principle underlying this invention.

FIG. 2 is a block diagram illustrating a basic principle underlying this invention.

This invention relates to a skew adjustment apparatus of the signal delay time for use in a digital system having a timing signal supply path 31 for supplying a timing signal to a digital circuit e.g. a flip-flop.

A skew adjustment apparatus shown in FIG. 2 comprises a propagation delay time adjustment unit 35 and a first delay unit 34 provided on a timing signal supply path 31, a first return path 32 connected to the timing signal supply path 31, a second delay unit 36 provided on the first return path 32, and a selection unit 38.

The selection unit 38 selectively forms either a first loop circuit formed by a first return path 32 and including the first and second delay units 34 and 36 and the propagation delay time adjustment unit 35, or a second loop circuit formed by a second return path 39 and including the first and second delay units 34 and 36 but excluding the propagation delay time adjustment unit 35.

The skew adjustment apparatus shown in FIG. 2 further comprises a third return path 33 connected to a timing signal supply path 31, a third delay unit 37 provided on a third return path 33 and having a propagation delay time equivalent to that of the first delay unit 34, the selection unit 38 being able to selectively form a third loop circuit including the first, second and third delay units 34, 36 and 37 but excluding a propagation delay time adjustment unit 35. The only consideration here is that it is necessary to construct a loop such that it always includes an odd number of inverters so that it can oscillate as a ring oscillator, no matter what return path the selection unit 38 selects.

The propagation delay time adjustment unit 35 may be e.g. a VDL, and each of the first, second and third delay units 34, 36 and 37 may be e.g. a buffer circuit, an input buffer circuit, and an output buffer circuit in an LSI chip. The selection unit 38 may be e.g. a selector or a switching circuit.

A digital system to which this invention is applied provides the skew adjustment apparatus shown in FIG. 2 for each timing signal supply path 31.

When the selection unit 38 forms the first loop circuit, it also forms a ring oscillator, from whose oscillating frequency a propagation delay time of the first loop circuit having a sum of those of the first and second delay units 34 and 36, the propagation delay time adjustment unit 35 and the selection unit 38, is obtained.

When the selection unit 38 forms the second loop circuit, it also forms a ring oscillator, from whose oscillating frequency a propagation delay time of the second loop circuit having a sum of those of the first and second delay units 34 and 36, and the selection unit 38, is obtained.

By subtracting a propagation delay time of the second loop circuit from the propagation delay time of the first loop circuit, the propagation delay time of a part excluding the first delay unit 34 from the timing signal supply path 31 is obtained. By performing this operation for each timing signal supply path 31, an adjustment of the propagation delay time adjustment unit 35 on each timing signal supply path 31 enables the propagation delay time over each timing signal supply path 31 to be strictly uniform, when the propagation delay time of the first delay unit 34 has little variation.

When the selection unit 38 forms the third loop circuit, it also forms a ring oscillator, from whose oscillating frequency a propagation delay time of the third loop circuit having a sum of those of the first, second and third delay units 34, 36 and 37, and the selection unit 38, is obtained.

By subtracting a propagation delay time of the second loop circuit from the propagation delay time of the third loop circuit, the propagation delay time of the third delay unit 37 is obtained. Because the propagation delay time of the third delay unit 37 is equivalent to the propagation delay time of the first delay unit 34, the propagation delay time of the first delay unit 34 is also obtained.

By adding the propagation delay time of the first delay unit 34 to the propagation delay time of the part excluding the first delay unit 34 from the timing signal supply path 31, the propagation delay time of the timing signal supply path 31 is obtained. Thus, the propagation delay time of the first return path is excluded from the propagation delay time of the first loop circuit.

By performing this operation for each timing signal supply path 31, an adjustment of the propagation delay time adjustment unit 35 on each timing signal supply path 31 enables the propagation delay time over each timing signal supply path 31 to be strictly uniform.

As embodiments of this invention, a skew adjustment apparatus for adjusting the propagation delay time over a clock supply path for a digital system operating with a high frequency clock signal in a frequency range between one hundred and fifty megahertz [150 MHz] and three hundred megahertz [300 MHz] is obtained. However, an application of this invention is by no means limited to the skew adjustment of a clock signal, but includes the skew adjustment of any other timing signals for use in a digital circuit. Also, an application of this invention is by no means limited to the skew adjustment of a clock signal or those of any other timing signals in a frequency range between one hundred and fifty megahertz [150 MHz] and three hundred megahertz [300 MHz], but includes any frequency in a range not more than one hundred and fifty megahertz [150 MHz] or not less than three hundred megahertz [300 MHz]. Presented below are the descriptions of specific embodiments with reference to drawings.

Figure 3:
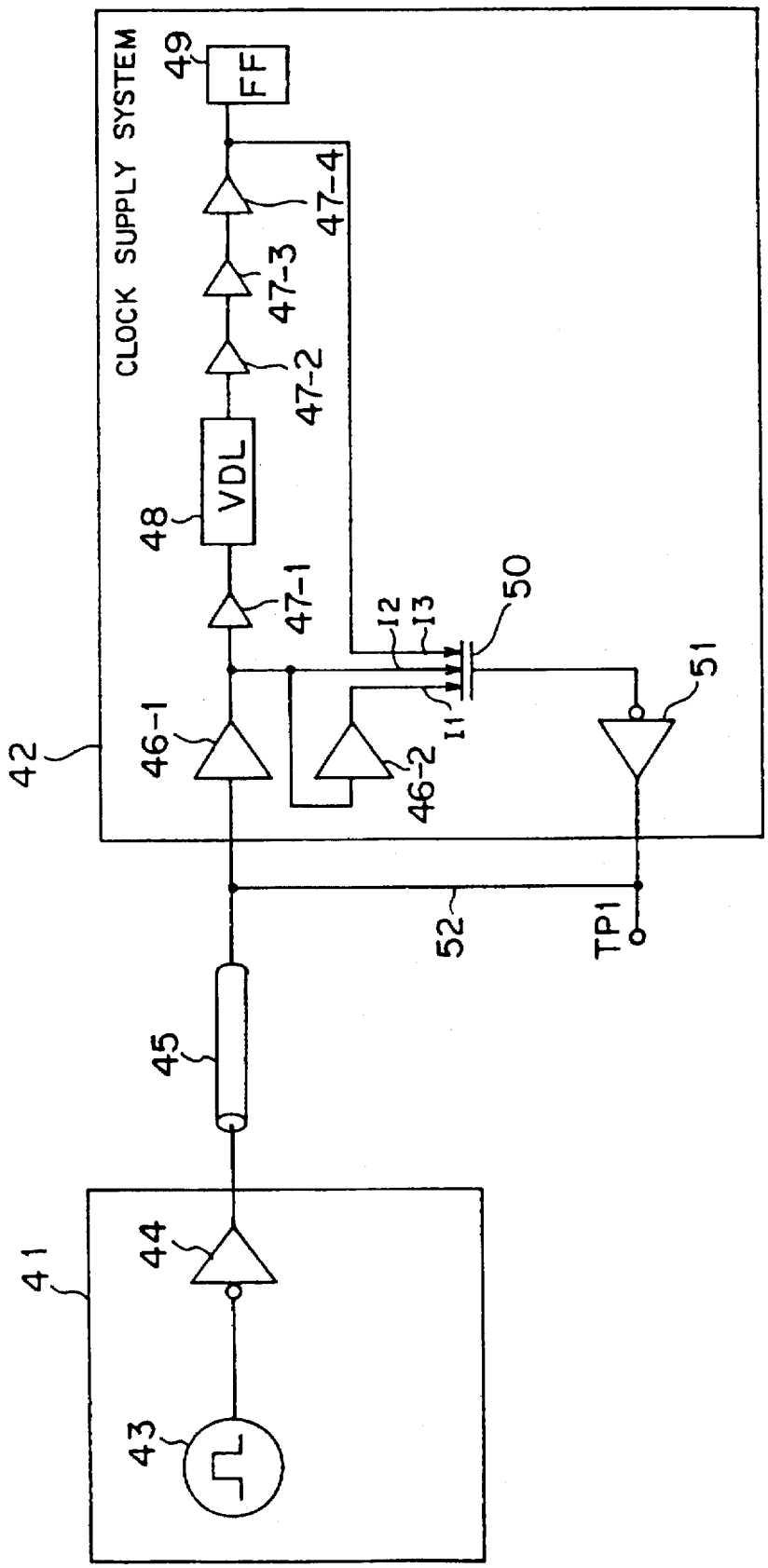
FIG. 3 is a block diagram illustrating a digital system using a skew adjustment apparatus, pursuant to a first embodiment of this invention.

FIG. 3 is a block diagram illustrating a digital system using a skew adjustment apparatus, pursuant to a first embodiment of this invention.

A digital system shown in FIG. 3 comprises a clock supply circuit 41, a plurality of clock reception circuits, and inter-circuit wirings between a clock supply circuit 41 and respective clock reception circuits. More specifically, FIG. 3 shows one of a plurality of clock reception circuits and one of a plurality of inter-circuit wirings as a clock reception circuit 42 and an inter-circuit wiring 45, respectively. The clock supply circuit 41 or each of clock reception circuits corresponds to one LSI (large scale integration) chip.

Clock supply circuit 41 has a clock oscillator 43 for generating a clock signal, and outputs a generated clock signal via an output buffer circuit 44 to inter-circuit wiring 45.

As well, clock reception circuit 42 also has a flip-flop (FF) 49 operating upon an input of a clock signal supplied from clock supply circuit 41.

In an ordinary operating mode, flip-flop 49 receives at its clock input terminal a clock signal inputted into clock reception circuit 42 via inter-circuit wiring 45 and supplied through a clock supply system comprising an input buffer circuit 46-1, buffers 47-1, 47-2, 47-3 and 47-4, and a variable delay line (VDL) 48. Flip-flop 49 is also connected to other circuits (not shown) in clock reception circuit 42.

Clock reception circuit 42 further comprises a selector 50 having three inputs and one output. An output buffer circuit 51 connects an output terminal of selector 50 to a test terminal TP1. An external wiring 52 connects the test terminal TP1 to an input terminal of input buffer circuit 46-1 immediately external to clock reception circuit 42. In the first embodiment, output buffer circuit 51 includes a part having an inverter function, such that a closed loop can oscillate as a ring oscillator.

The selector 50 has an input terminal I2 and an input terminal I3 connected to an output side of input buffer circuit 46-1 and a clock input terminal of flip-flop 49, respectively. An input buffer circuit 46-2 having characteristics equivalent to those of input buffer circuit 46-1 connects input buffer circuit 46-1 to input terminal I1 of selector 50. Because both input buffer circuit 46-1 and input buffer circuit 46-2 having small loads to be driven on their output side, the use of a small transistor is sufficient. Thus, for example, any variation in transistor characteristics for driving electrostatic capacitance is small, and it is easy to select ones having equivalent characteristics as input buffer circuit 46-1 and input buffer circuit 46-2. In this case, input buffer circuit 46-1 and input buffer circuit 46-2 have nearly identical propagation delay times (signal delay times).

A VDL 48 is a programmable delay circuit capable of changing the signal delay time generated between its input terminal and its output terminal by an input of a digital code.

Figure 4:
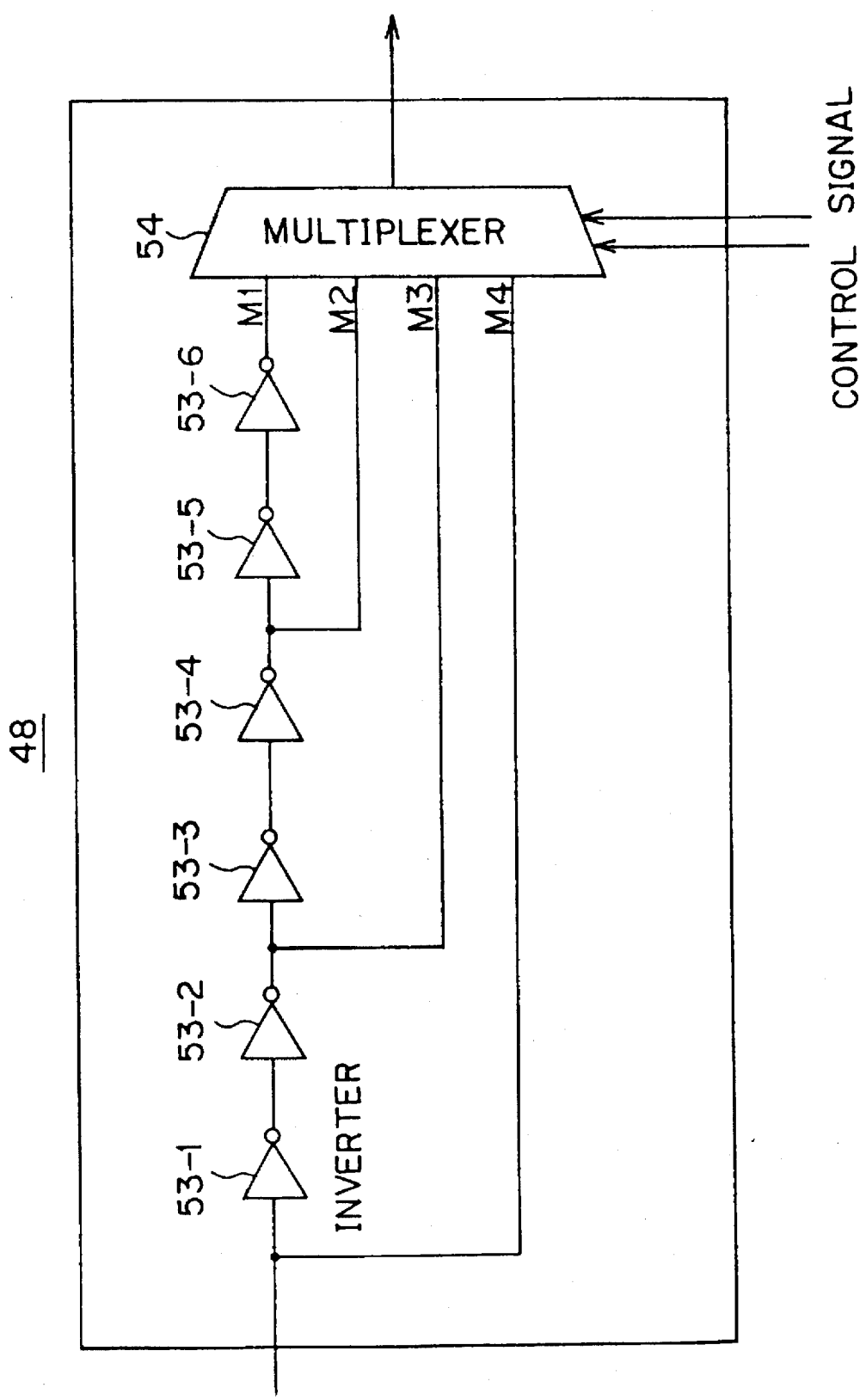
FIG. 4 is a block diagram illustrating an example of a variable delay line.

FIG. 4 is a block diagram illustrating a variable delay line.

More specifically, FIG. 4 shows an example of VDL 48 shown in FIG. 3.

VDL 48 comprises six serially connected inverters 53-1 through 53-6 and a multiplexer 54 receiving as its four input signals a raw input into VDL 48 and respective outputs from three inverters 53-2, 53-4 and 53-6. Multiplexer 54 selects any one of the four input signals received at its input ports M1, M2, M3 and M4, dependent upon an input of a 2-bit control signal for an output as an output signal of VDL 48. Because each inverter has a predetermined signal delay time, a selection of an input port of multiplexer 54 enables VDL 48 to change the signal delay time generated between an input terminal and an output terminal of VDL 48. For instance, a propagation delay time generated upon selecting input port M4 has only a propagation delay time caused by multiplexer 54, a propagation delay time generated upon selecting input port M3 is equivalent to a sum of respective propagation delay times caused by inverters 53-1 and 53-2 and multiplexer 54.

A configuration of VDL 48 shown in FIG. 3 may be different than the one shown in FIG. 4, as long as a propagation delay time generated between an input terminal and an output terminal of the clock signal is variable. For instance, it is possible to configure VDL 48 by providing a plurality of capacitors each having a different electrostatic capacitance between a signal line and the GND level, and by having e.g. an FET (field effect transistor) switch select one of those capacitors for a connection to a signal line, thus making a propagation delay time variable.

Output buffer circuits 44 and 51 are both tri-state output inversion type buffer circuits, having two output states, which are a high impedance state not driving an output terminal and a low impedance state outputted by inverting an input signal. A mode switch signal (not shown) sets an output state.

Other clock reception circuits (not shown) have configurations similar to clock reception circuit 42.

Described next are operations and procedures of a digital system shown in FIG. 3.

In an ordinary operating mode for supplying a clock signal e.g. to flip-flop 49, first of all the mode switch signal sets output buffer circuit 44 to the low impedance state and output buffer circuit 51 to the high impedance state. Thus, input buffer circuit 46-1 receives the clock signal from clock oscillator 43 via output buffer circuit 44 and inter-circuit wiring 45. On the other hand, because output buffer circuit 51 is in a high impedance state, it does not drive an input terminal of input buffer circuit 46-1.

Flip-flop 49 operates according to the clock signal inputted to input buffer circuit 46-1, which is supplied via VDL 48 and others. At this time, a circuit comprising output buffer circuit 44, inter-circuit wiring 45, input buffer circuit 46-1, VDL 48, and buffers 47-1, 47-2, 47-3 and 47-4, forms a clock supply path to flip-flop 49. In the ordinary operating mode, no matter which input terminal selector 50 selects, since the output buffer circuit 51 is in the high impedance state, flip-flop 49 receives a clock signal without any problem.

Figure 5:
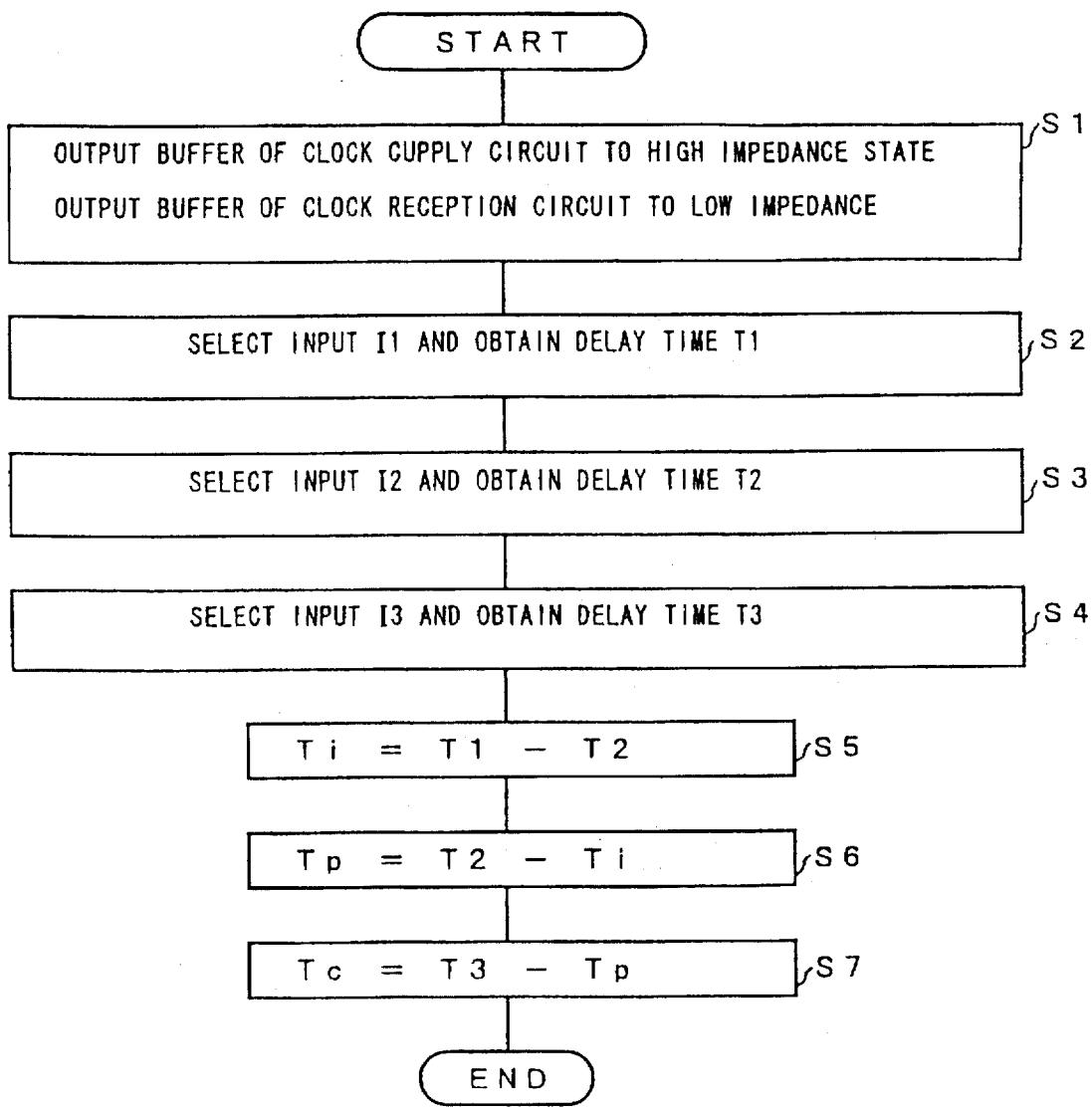
FIG. 5 is a flowchart illustrating a propagation delay time measurement process, pursuant to a first embodiment of this invention.

FIG. 5 is a flowchart illustrating a propagation delay time measurement process, pursuant to a first embodiment of this invention.

Explained next are operations in a skew adjustment mode for performing a skew adjustment of a clock supply path in accordance with steps shown in FIG. 5.

First, the mode switch signal sets output buffer circuit 44 to the high impedance state and output buffer circuit 51 to the low impedance state (step S1). Because of this, output buffer circuit 44 no longer drives input buffer circuit 46-1, but output buffer circuit 51 drives an input terminal of input buffer circuit 46-1.

Second, a selection signal (not shown) has selector 50 select input terminal I1, thereby forming a circuit shaped in a closed loop comprising input buffer circuits 46-1 and 46-2, selector 50, output buffer circuit 51, and external wiring 52. The circuit shaped in a closed loop forms a ring oscillator, which generates a pulse having a cycle double the signal delay time T1 for one circuit of the closed loop. Then, a generated pulse frequency is measured, by connecting a counter to test terminal TP1. Further, the inverse of the obtained frequency is divided by two to obtain a propagation delay time T1 (step S2). Alternatively, it is possible to obtain propagation delay time T1 by having the counter directly measure the generated pulse cycle. Propagation delay time T1 corresponds to the propagation delay time of a circuit comprising input buffer circuits 46-1 and 46-2, selector 50, output buffer circuit 51, and external wiring 52.

Third, the selection signal has selector 50 select input terminal I2, thereby forming a circuit shaped in a closed loop comprising input buffer circuit 46-1, selector 50, output buffer circuit 51, and external wiring 52. Then, by using a technique similar to that of step S2, a propagation delay time T2 is obtained of the ring oscillator comprising input buffer circuit 46-1, selector 50, output buffer circuit 51 and external wiring 52 (step S3).

Fourth, the selection signal has selector 50 select an input terminal I3, thereby forming a circuit shaped in a closed loop comprising input buffer circuit 46-1, VDL 48, buffers 47-1 through 47-4, selector 50, output buffer circuit 51 and external wiring 52. Then, by using a technique similar to that of step S2, a propagation delay time T3 is obtained of the ring oscillator comprising input buffer circuit 46-1, VDL 48, buffers 47-1 through 47-4, selector 50, output buffer circuit 51 and external wiring 52 (step S4).

Fifth, by subtracting propagation delay time T2 obtained in step S3 from propagation delay time T1 obtained in step S2, a propagation delay time Ti of input buffer circuit 46-2 is obtained (step S5). As described earlier, because input buffer circuit 46-1 and input buffer circuit 46-2 can be regarded as having nearly identical propagation delay times, propagation delay time Ti thus obtained can be regarded as a propagation delay time of input buffer circuit 46-1.

Sixth, by subtracting propagation delay time Ti obtained in step S5 from propagation delay time T2 obtained in step S3, a propagation delay time Tp is obtained of a return path comprising selector 50, output buffer circuit 51, and external wiring 52 (step S6).

Seventh, by subtracting propagation delay time Tp of the return path obtained in step S6 from propagation delay time T3 obtained in step S4, a propagation delay time Tc is obtained of a clock supply system comprising input buffer circuit 46-1, VDL 48 and buffers 47-1 through 47-4 (step S7).

In a skew adjustment mode, operations shown in FIG. 5 are performed for all other clock reception circuits (not shown), thereby obtaining propagation delay times of clock supply systems in respective clock reception circuits. Then, the propagation delay time of VDL 48 is adjusted, such that propagation delay time Tc obtained in step S7 matches the propagation delay times of clock supply systems of other clock reception circuits. Such a skew adjustment enables each clock reception circuit to precisely match the propagation delay time over a clock supply path in clock reception circuit 42, to the entire propagation delay time over a clock supply path stretching from clock oscillator 43 to a clock input terminal of flip-flop 49.

In an initial state before performing a skew adjustment, propagation delay times of VDL's of respective clock reception circuits are set to a value around the center of the adjustment range, such that these values may be increased or decreased later. Then, respective VDL's are adjusted, based on the average value of propagation delay times of a clock supply system of all clock reception circuits obtained by operations shown in FIG. 5, or the propagation delay time of a clock reception circuit closest to the average value. This minimizes the amount of adjustment of propagation delay times of respective VDL's. In the example of VDL 48 shown in FIG. 4, the control signal selects an input terminal M2 or M3 of multiplexer 54 before a skew adjustment. Then, upon a skew adjustment, other input terminals are selected as necessary for changing a propagation delay time of VDL 48.

When the propagation delay time of a clock supply system excluding a VDL is about five nanoseconds [5 nsec], it is sufficient to set a propagation delay time of the VDL in an initial state to about five nanoseconds [5 nsec]. This is because, in this case, an adjustment amount rarely exceeds five nanoseconds [5 nsec], upon a skew adjustment. It goes without saying that it is acceptable to set different values for a propagation delay time of VDL 48.

The propagation delay time of inter-circuit wiring 45 corresponding to a wiring between the LSI chip of clock supply circuit 41 and the LSI chip of clock reception circuit 42 may be separately calculated as an electrical length, i.e. the arrival time of a signal traveling over a wiring having a finite length. When inter-circuit wiring 45 is made of a wiring material having a uniform unit length electrostatic capacitance, the product between its wiring length and its known unit length signal delay time is a propagation delay time of inter-circuit wiring 45.

Alternatively, a propagation delay time of inter-circuit wiring 45 may be obtained by using a publicly known TDR (time domain reflectometer) technique. A TDR is a measurement apparatus for observing by a high speed oscilloscope a reflection wave of an appropriate pulse signal inputted from one terminal of a signal line and returning there after being reflected by the other terminal of the signal line. By appropriately setting a time axis range of the oscilloscope connected to an input point of the pulse signal, and by measuring the time difference between the inputted pulse signal and the reflected wave, a propagation delay time of the signal line of a measured object is calculated as a half of the measured time difference.

A more precise skew adjustment is made possible by adjusting the propagation delay time of VDL 48, such that each clock reception circuit has an identical sum of the propagation delay time of inter-circuit wiring 45 thus obtained and propagation delay time Tc of clock reception circuit 42. At this time, VDL's in other clock reception circuits are also adjusted as necessary.

Because inter-circuit wiring 45 does not include a semiconductor circuit element, its characteristics are little affected by temperature changes. As such, its propagation delay time changes little. Thus, its propagation delay time needs to be obtained only once in most cases.

On the other hand, respective circuit elements in a clock reception circuit change their electrical characteristics when temperatures of surroundings change. Hence, it is important to perform an adjustment, such that a skew of a clock signal is always kept to a minimum by repeating all steps shown in FIG. 5 for respective clock reception circuits, and thereby obtaining respective propagation delay time in these clock reception circuits, again. As well, upon exchanging a malfunctioning circuit part with another circuit part, a readjustment of skew may be necessary. Further, upon using an extremely sensitive part, a readjustment of skew may be necessary after operating it ordinarily for a certain period.

Pursuant to the first embodiment, in the skew adjustment mode, a counter is connected to test terminal TP1 provided on an output side of output buffer circuit 51, thereby measuring the oscillating frequency of a ring oscillator. However, in principle, it may be measured at any point on the loop forming the ring oscillator. Still, because clock reception circuit 42 is an LSI chip, when connecting a counter from the outside, it is more convenient to use test terminal TP1 and an input terminal for a clock signal of clock reception circuit 42.

Another method is possible, whereby a counter circuit for measuring an oscillating pulse frequency is incorporated at an appropriate position in a clock reception circuit. In this case, in the skew adjustment mode, a counter circuit receives a measurement pulse maintaining its HIGH level over a sufficiently long period of time, for example, longer than the pulse duration of an oscillating cycle of a ring oscillator, and counts the number of oscillating pulses passing through while the measurement pulse remains at the HIGH level. A division of the time interval of the measurement pulse by the obtained number of oscillating pulses produces the cycle of oscillating pulses, i.e. a value double the propagation delay time of a ring oscillator.

Figure 6:
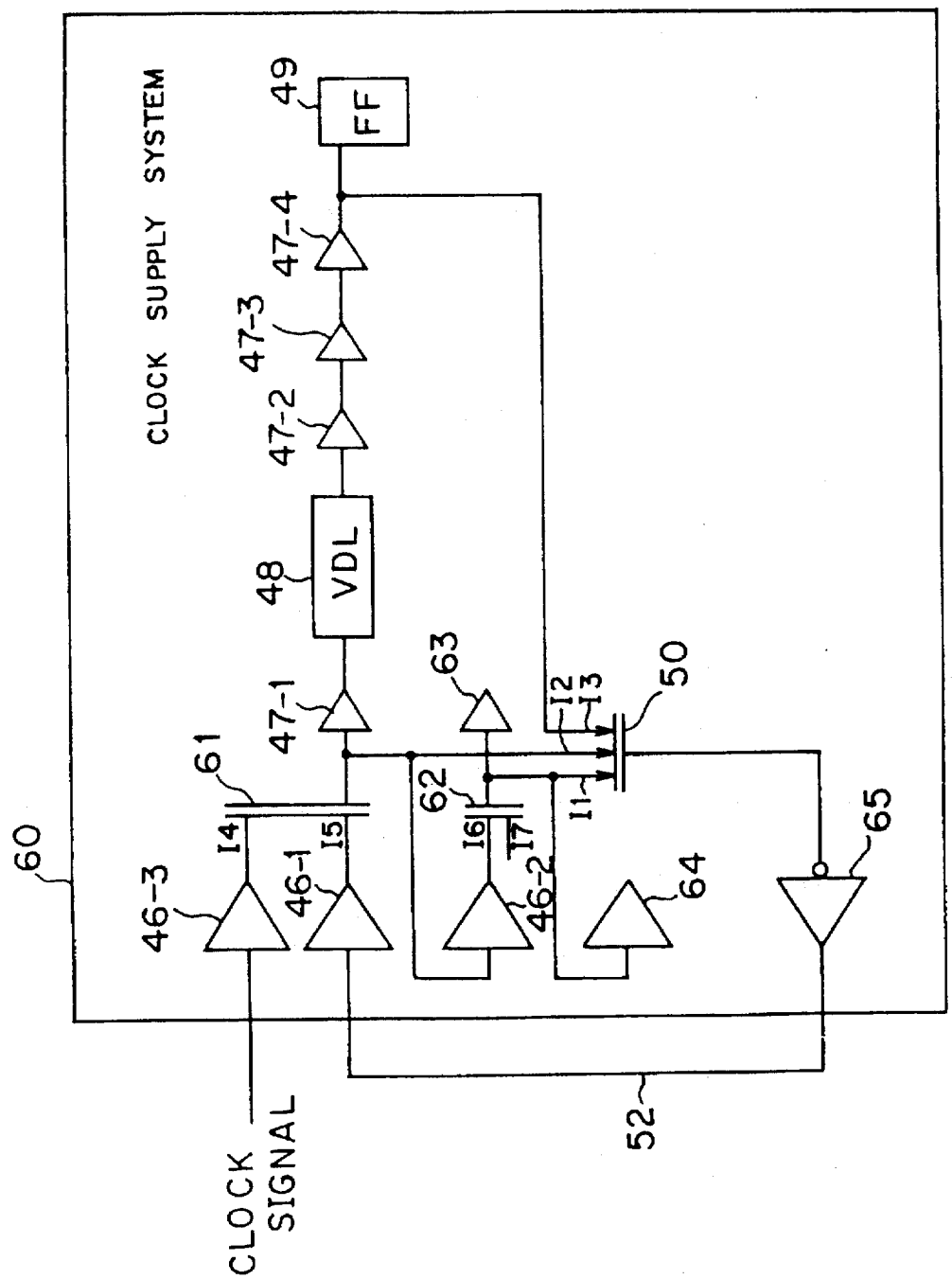
FIG. 6 is a block diagram illustrating a clock receiving circuit using a skew adjustment apparatus, pursuant to a second embodiment of this invention.

FIG. 6 is a block diagram illustrating a clock reception circuit using a skew adjustment apparatus, pursuant to a second embodiment of this invention.

Circuits in a clock reception circuit 60 shown in FIG. 6, which are the same as circuits shown in FIG. 3, have the same reference numbers.

In the first embodiment shown in FIG. 3, though input buffer circuit 46-1 and input buffer circuit 46-2 have very little difference in their characteristics, because both input buffer circuits 46-1 and 46-2 drive different loads on their output sides between the time when selector 50 selects its input terminal I1 and the time when selector 50 selects input terminal I2, respective propagation delay times do not strictly match, when propagation delay times are measured. Thus, a skew adjustment apparatus shown in FIG. 6 causes a load similar to the one driven by input buffer circuit 46-1 to be connected on an output side of input buffer circuit 46-2, for precisely matching the propagation delay time of input buffer circuit 46-1 with that of input buffer circuit 46-2 in the skew adjustment mode, An output terminal of input buffer circuit 46-2 is connected to a selector 62, which is a part of the same type as a selector 61 connected to an output terminal of input buffer circuit 46-1. An output terminal of selector 62 is connected to a buffer 63 of the same type as buffer 47-1 and an input buffer circuit 64 of the same type as input buffer circuit 46-2. Selector 50 is connected to both an output terminal of selector 61 and an output terminal of selector 62.

Selector 61 is provided for switching between an output from input buffer circuit 46-3 and an output from input buffer circuit 46-1. Input buffer circuit 46-3 is an input buffer circuit of the same type as input buffer circuit 46-1, having the same propagation delay time. Selector 61 is controlled by a mode switch signal (not shown). In the ordinary operating mode, selector 61 outputs to buffer 47-1 a clock signal supplied from a clock supply circuit (not shown) by selecting an input terminal I4. In the skew adjustment mode, selector 61 forms a ring oscillator by selecting an input terminal I5. Accordingly, in the second embodiment, in the ordinary operating mode, an output buffer circuit 65 need not be set in a high impedance state, and need not be a tri-state type circuit.

In this manner, by setting the load capacitance driven by input buffer circuit 46-1 equal to that driven by input buffer circuit 46-2, regarding the propagation delay time of a closed loop circuit obtained by selecting input terminal I1 of selector 50, the propagation delay time of input buffer circuit 46-1 can be strictly matched with that of input buffer circuit 46-2. As such, the propagation delay time of a clock supply system obtained by operations in steps S5, S6 and S7 (shown in FIG. 5) becomes more precise, thereby enabling an exact skew adjustment.

Figure 7:
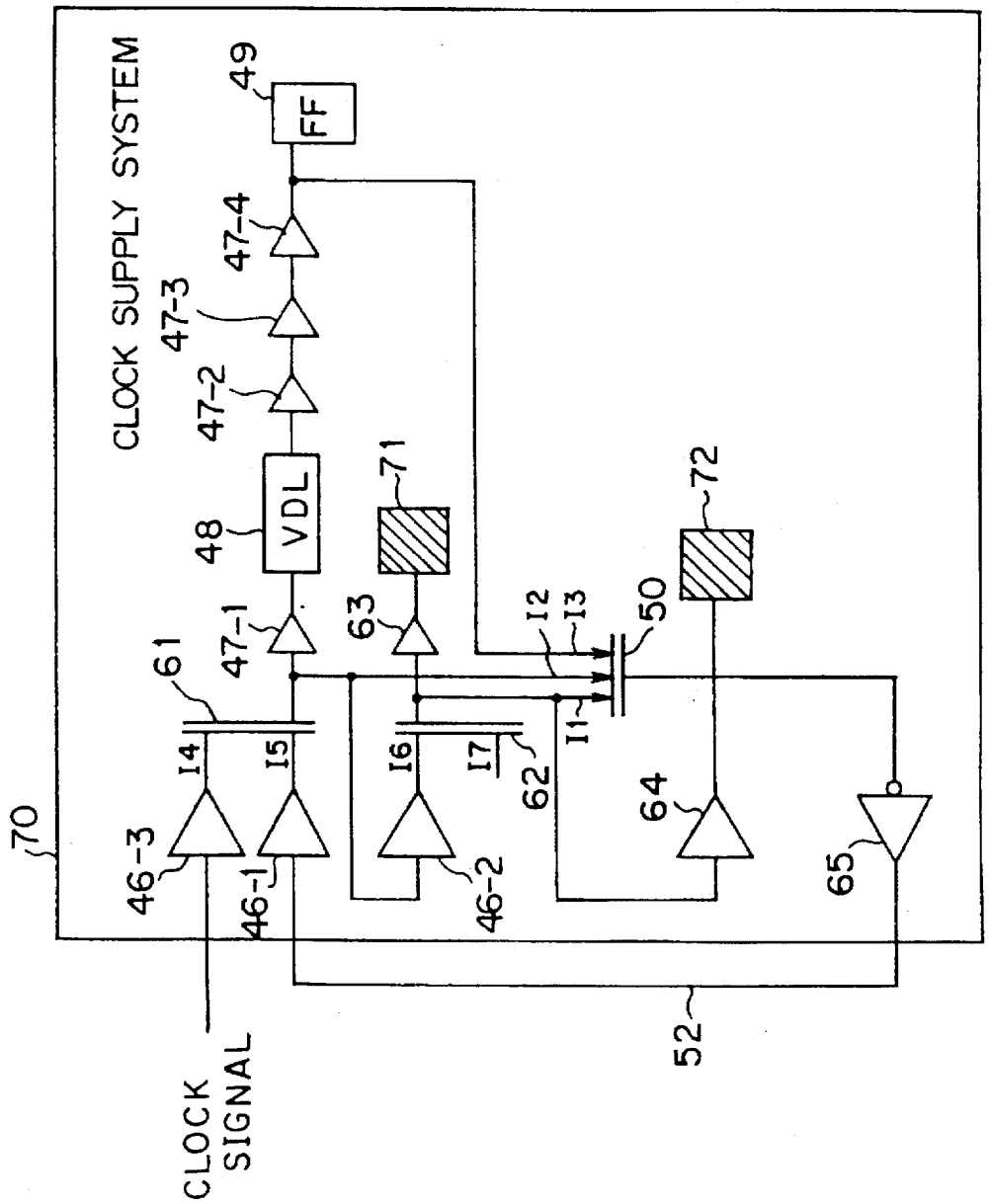
FIG. 7 is a block diagram illustrating a clock receiving circuit using a skew adjustment apparatus, pursuant to a third embodiment of this invention.

FIG. 7 is a block diagram illustrating a clock reception circuit using a skew adjustment apparatus, pursuant to a third embodiment of this invention.

Circuits in a clock reception circuit 70 shown in FIG. 7, which are the same as circuits shown in FIG. 6, have the same reference numbers.

Clock reception circuit 70 shown in FIG. 7 is obtained by adding dummy load circuits 71 and 72 to clock reception circuit 60 shown in FIG. 6.

Dummy load circuit 71 has the same load capacitance as that of the load, i.e. a circuit comprising VDL 48, buffers 47-2, 47-3 and 47-4, and the flip-flop 49, on an output side of buffer 47-1. Dummy load circuit 72 has the same load capacitance as that of the load, i.e. a circuit comprising selector 62, buffer 63, dummy load circuit 71, selector 50, an input buffer circuit 64, on an output side of input buffer circuit 46-2.

Thus, by more closely approximating a load driven by input buffer circuit 46-2 with a load driven by input buffer circuit 46-1, the third embodiment enables a skew adjustment even more precise than that of the second embodiment.

Although in the first, second and third embodiments of this invention, a VDL for adjusting a skew of a clock signal is provided in a clock reception circuit as described above, it is possible to provide a VDL in a clock supply circuit. Described below are embodiments in which a VDL is provided in a clock supply circuit.

Figure 8:
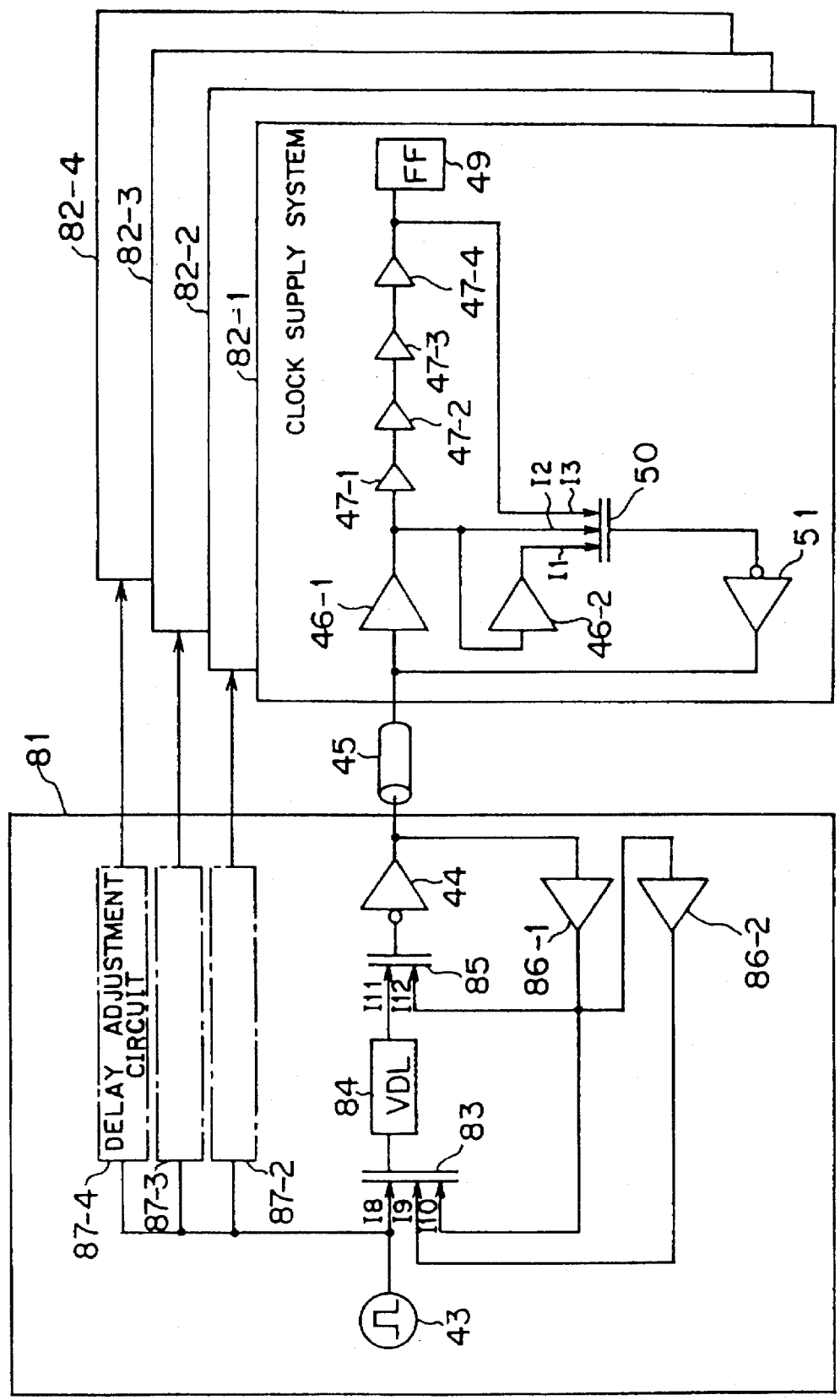
FIG. 8 is a block diagram illustrating a digital system using a skew adjustment apparatus, pursuant to a fourth embodiment of this invention.

FIG. 8 is a block diagram illustrating a digital system using a skew adjustment apparatus, pursuant to a fourth embodiment of this invention.

Circuits shown in FIG. 8, which are the same as circuits shown in FIG. 3, have the same reference numbers. A digital system shown in FIG. 8 comprises a clock supply circuit 81 and clock reception circuits 82-1, 82-2, 82-3 and 82-4. Each of clock supply circuit 81 and clock reception circuits 82-1, 82-2, 82-3 and 82-4 corresponds to one LSI chip.

Clock reception circuit 82-1 shown in FIG. 8 has the same configuration as clock reception circuit 42 (shown in FIG. 3), except that the former does not have a VDL. Clock reception circuit 82-1 comprises circuits, such as selector 50 and input buffer circuit 46-2, for measuring a propagation delay time. Each of other clock reception circuits 82-2, 82-3 and 82-4, as with clock reception circuit 82-1, comprises circuits for measuring a propagation delay time.

A clock supply circuit 81, different than the clock supply circuit 41 shown in FIG. 3, has a delay adjustment circuit comprising a selector 83, a VDL 84, a selector 85, output buffer circuit 44, and input buffer circuits 86-1 and 86-2. Each of delay adjustment circuits 87-2, 87-3 and 87-4 has a similar configuration. Output buffer circuit 44 supplies a clock signal generated by a clock oscillator 43 via inter-circuit wiring 45 to clock reception circuit 82-1. Delay adjustment circuits 87-2, 87-3 and 87-4 supply the clock signal to clock reception circuits 82-2, 82-3 and 82-4, respectively.

Output buffer circuits 44 and 51, as with those in the first embodiment, are both tri-state output inversion type buffer circuits. An output status setting signal (not shown) sets their output states.

In the ordinary operating mode, the output status setting signal sets output buffer circuit 44 to a low impedance state and output buffer circuit 51 to a high impedance state. Further, a selection signal (not shown) has selector 83 select an input terminal I8 and selector 85 to select an input terminal I11. At this time, a clock signal is supplied to a clock input terminal of flip-flop 49 via a clock supply path comprising selector 83, VDL 84, selector 85, output buffer circuit 44, inter-circuit wiring 45, input buffer circuit 46-1, and buffers 47-1, 47-2, 47-3, 47-4.

The output status setting signal and the selection signal respectively set delay adjustment circuits 87-2, 87-3 and 87-4 as well as clock reception circuits 82-2, 82-3 and 82-4 to the ordinary operating mode in a similar manner. Delay adjustment circuits 87-2, 87-3 and 87-4 supply the clock signal for circuits (not shown) in clock reception circuits 82-2, 82-3 and 82-4 requiring a clock signal, respectively.

Figure 9:
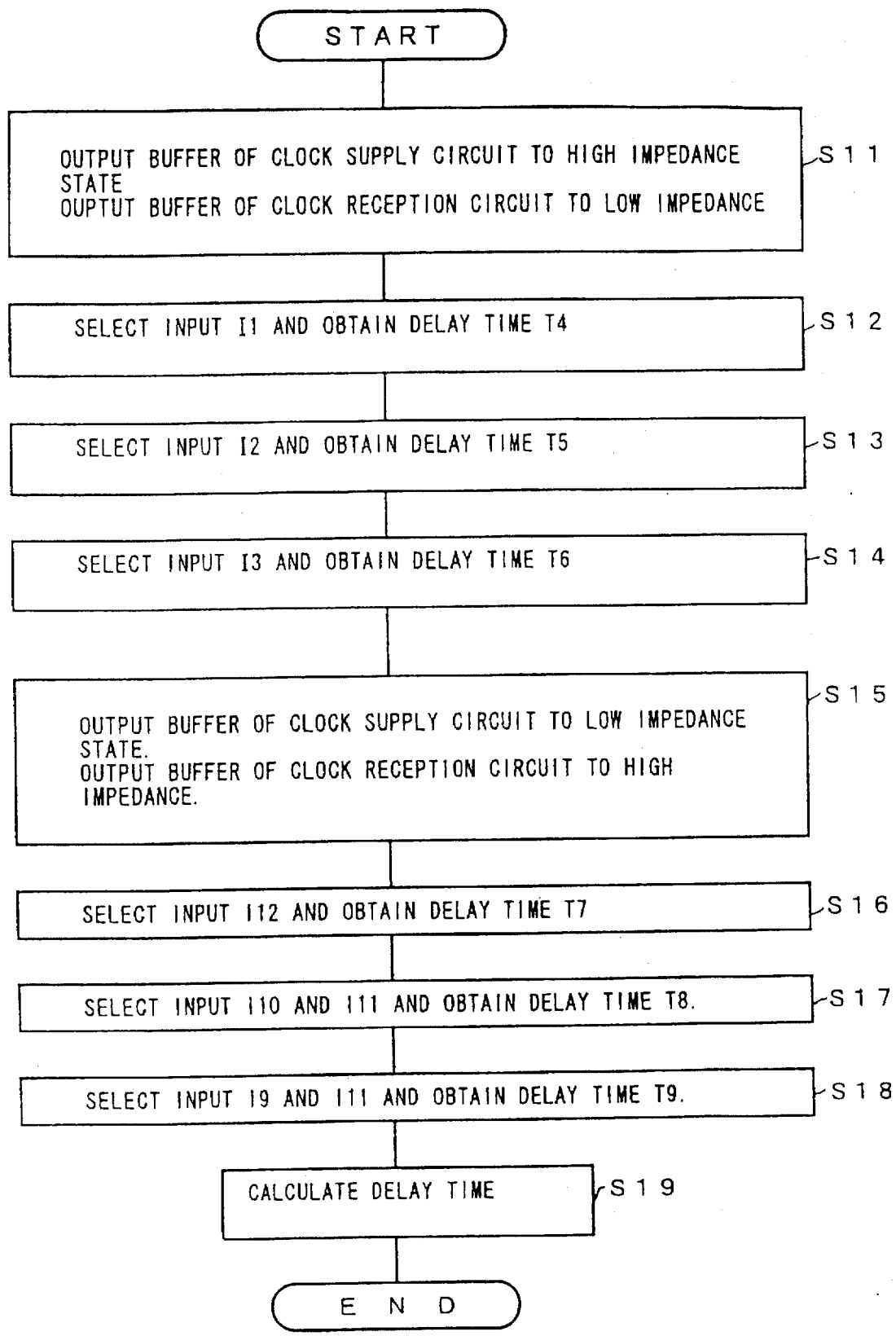
FIG. 9 is a flowchart illustrating a propagation delay time measurement process, pursuant to a fourth embodiment of this invention.
Figure 10:
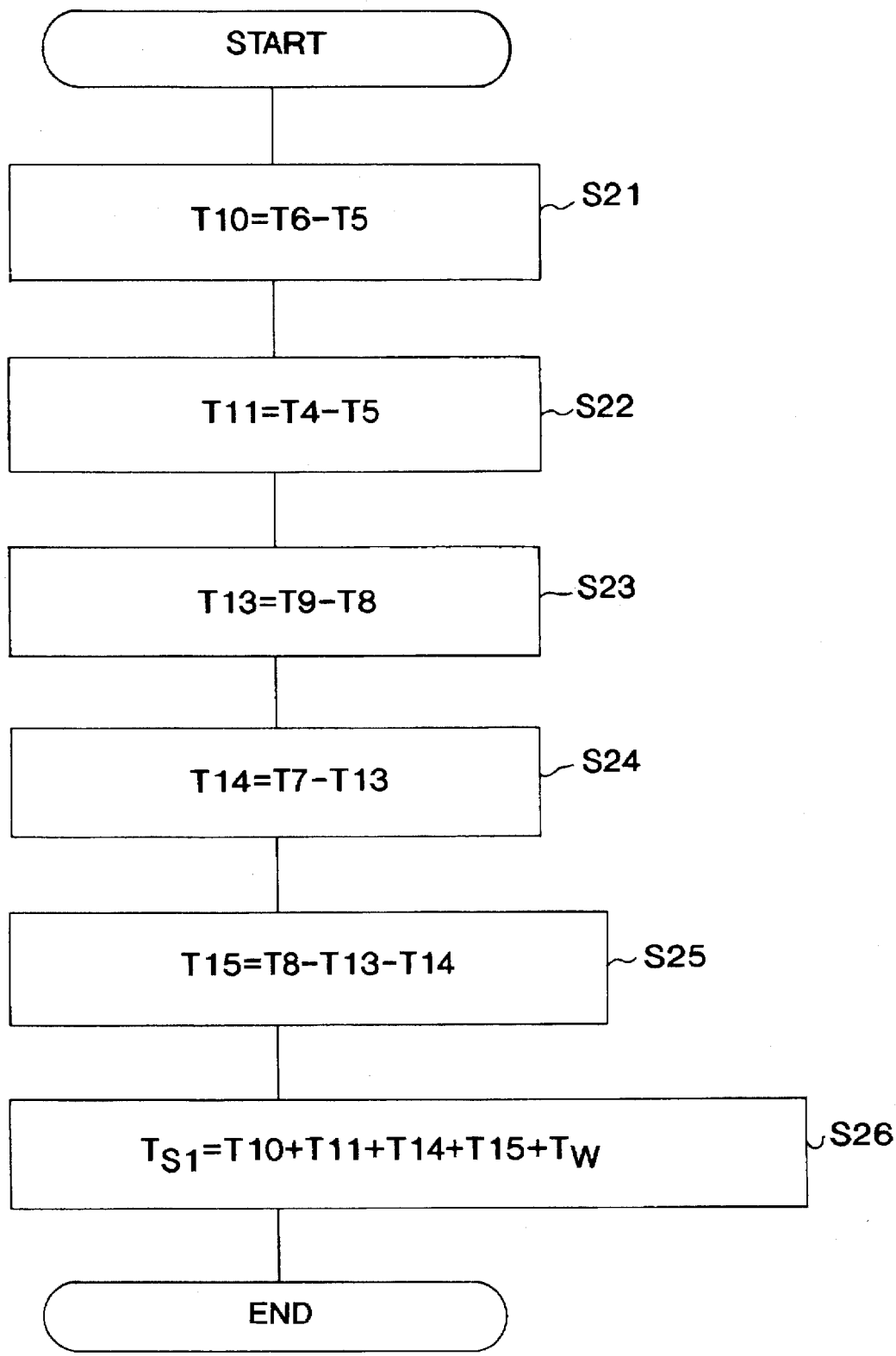
FIG. 10 is a flowchart illustrating a propagation delay time calculation process, pursuant to a fourth embodiment of this invention.

Explained further is the skew adjustment mode of the fourth embodiment by referring to FIG. 9 and FIG. 10.

FIG. 9 is a flowchart illustrating a propagation delay time measurement process, pursuant to a fourth embodiment of this invention.

In the skew adjustment mode, first of all, for measuring the signal delay time of each closed loop circuit in clock reception circuit 82-1, the output status setting signal sets output buffer circuit 44 to a high impedance state and output buffer circuit 51 to a low impedance state (step S11). This is similar to a step shown in FIG. 5. At this time, the oscillating frequency of a ring oscillator in clock reception circuit 82-1 is measured by a counter provided e.g. around an output terminal of output buffer circuit 51, around an input terminal of input buffer circuit 46-1, around an output terminal of output buffer circuit 44 of clock supply circuit 81, or in clock reception circuit 82-1.

Initially, the selection signal has selector 50 select input terminal I1, for obtaining a propagation delay time T4 of a loop circuit comprising input buffer circuits 46-1 and 46-2, selector 50 and output buffer circuit 51 (step S12).

Secondly, the selection signal has selector 50 select input terminal I2, for obtaining a propagation delay time T5 of a loop circuit comprising input buffer circuit 46-1, selector 50 and output buffer circuit 51 (step S13).

Thirdly, the selection signal has selector 50 select input terminal I3, for obtaining a propagation delay time T6 of a loop circuit comprising input buffer circuit 46-1, buffers 47-1 through 47-4, selector 50 and output buffer circuit 51 (step S14).

Then, for measuring the propagation delay time of each closed loop circuit in clock supply circuit 81, the output status setting signal sets output buffer circuit 44 to a low impedance state and output buffer circuit 51 to a high impedance state (step S15). At this time, the oscillating frequency of a ring oscillator in clock supply circuit 81 is measured by a counter provided e.g. around an output terminal of output buffer circuit 44, around an input terminal of input buffer circuit 86-1, around an input terminal of input buffer circuit 46-1 of clock reception circuit 82-1, or in clock supply circuit 81.

Initially, the selection signal has selector 85 select an input terminal I12, for obtaining a propagation delay time T7 of a loop circuit comprising selector 85, output buffer circuit 44 and input buffer circuit 86-1 (step S16).

Secondly, the selection signal has the selection signal has selector 85 select an input terminal I11 and selector 83 select an input terminal I10, for obtaining a propagation delay time T8 of a loop circuit comprising selector 83, VDL 84, selector 85, output buffer circuit 44 and input buffer circuit 86-1 (step S17).

Thirdly, the selection signal has selector 85 select input terminal I11 and selector 83 to select an input terminal I9, for obtaining a propagation delay time T9 of a loop circuit comprising selector 83, VDL 84, selector 85, output buffer circuit 44, input buffer circuits 86-1 and 86-2 (step S18).

Then, by using propagation delay times T4 through T9 obtained respectively in steps S12, S13, S14, S16, S17 and S18, the signal delay time over a clock supply path for the flip-flop 49 is calculated (step S19). FIG. 10 shows in detail a propagation delay time calculation process in step S19.

FIG. 10 is a flowchart illustrating a propagation delay time calculation process, pursuant to a fourth embodiment of this invention.

In a propagation delay time calculation process, first, by subtracting propagation delay time T5 obtained in step S13 from propagation delay time T6 obtained in step S14, a propagation delay time T10 of a circuit comprising buffers 47-1, 47-2, 47-3 and 47-4 is obtained (step S21).

Second, by subtracting propagation delay time T5 obtained in S13 from propagation delay time T4 obtained in step S12, a propagation delay time T11 of input buffer circuit 46-2 is obtained (step S22). As with the first embodiment, since both input buffer circuit 46-1 and input buffer circuit 46-2 have almost identical propagation delay times, propagation delay time T11 thus obtained in step S22 is regarded as a propagation delay time of input buffer circuit 46-1.

Third, by subtracting propagation delay time T8 obtained in step S17 from propagation delay time T9 obtained in step S18, a propagation delay time T13 of input buffer circuit 86-2 is obtained (step S23). As with a relation between input buffer circuits 46-1 and 46-2, because input buffer circuit 86-1 and input buffer circuit 86-2 have little difference in characteristics e.g. of their electrostatic capacitances, they have almost identical signal delay times. Therefore, propagation delay time T13 thus obtained is regarded as a propagation delay time of input buffer circuit 86-1.

Fourth, by subtracting propagation delay time T13 of input buffer circuit 86-1 obtained in step S23 from propagation delay time T7 obtained in step S16, a propagation delay time T14 of a circuit comprising selector 85 and output buffer circuit 44 (step S24).

Fifth, by subtracting propagation delay times T13 and T14 obtained respectively in steps S23 and S24 from propagation delay time T8 obtained in S17, a propagation delay time T15 of a circuit comprising selector 83 and VDL 84 is obtained (step S25).

Sixth, by adding a propagation delay time Tw of inter-circuit wiring 45 to a sum of propagation delay times T10, T11, T14 and T15 obtained respectively in steps S21, S22, S24 and S25, a total propagation delay time Ts1 of a clock supply path stretching from an input side of selector 83 to an input side of flip-flop 49 is calculated (step S26). Propagation delay time Tw of inter-circuit wiring 45 is obtained beforehand e.g. by using a TDR technique explained in the description of the first embodiment.

A sum of propagation delay times T14 and T15 necessary in obtaining total propagation delay time Ts1 over a clock supply path may also be obtained by subtracting propagation delay time T13 of input buffer circuit 86-1 from propagation delay time T8 obtained in step S17.

In the skew adjustment mode, a total propagation delay time Ts1 over each of clock supply paths for supplying a clock signal respectively to other clock reception circuits 82-2, 82-3 and 82-4 is obtained by using the same procedures shown in FIG. 9 and FIG. 10. Then, a propagation delay time a VDL generates is adjusted by changing control signals supplied to respective VDL's, such that the propagation delay time of any clock supply path falls within a tolerance range. In this adjustment, after changing control signal supplied e.g. to VDL 84, procedures from step S15 to step S18 shown in FIG. 9 and procedures from step S23 to step S26 shown in FIG. 10 are repeated as necessary, thereby readjusting e.g. VDL 84. This adjustment is repeated until the propagation delay time of any clock supply path falls within the tolerance range. The fourth embodiment enables a skew adjustment for the signal delay time of the entire clock supply path including not only a propagation delay time of a clock reception circuit but also a propagation delay time of a clock supply circuit.

Again after a skew adjustment, the output status setting signal sets output buffer circuit 44 to a low impedance state and output buffer circuit 51 to a high impedance state. As well, the selection signal has selector 83 select an input terminal I8 and selector 85 select an input terminal I11, for shifting to an ordinary system operation.

Figure 11:
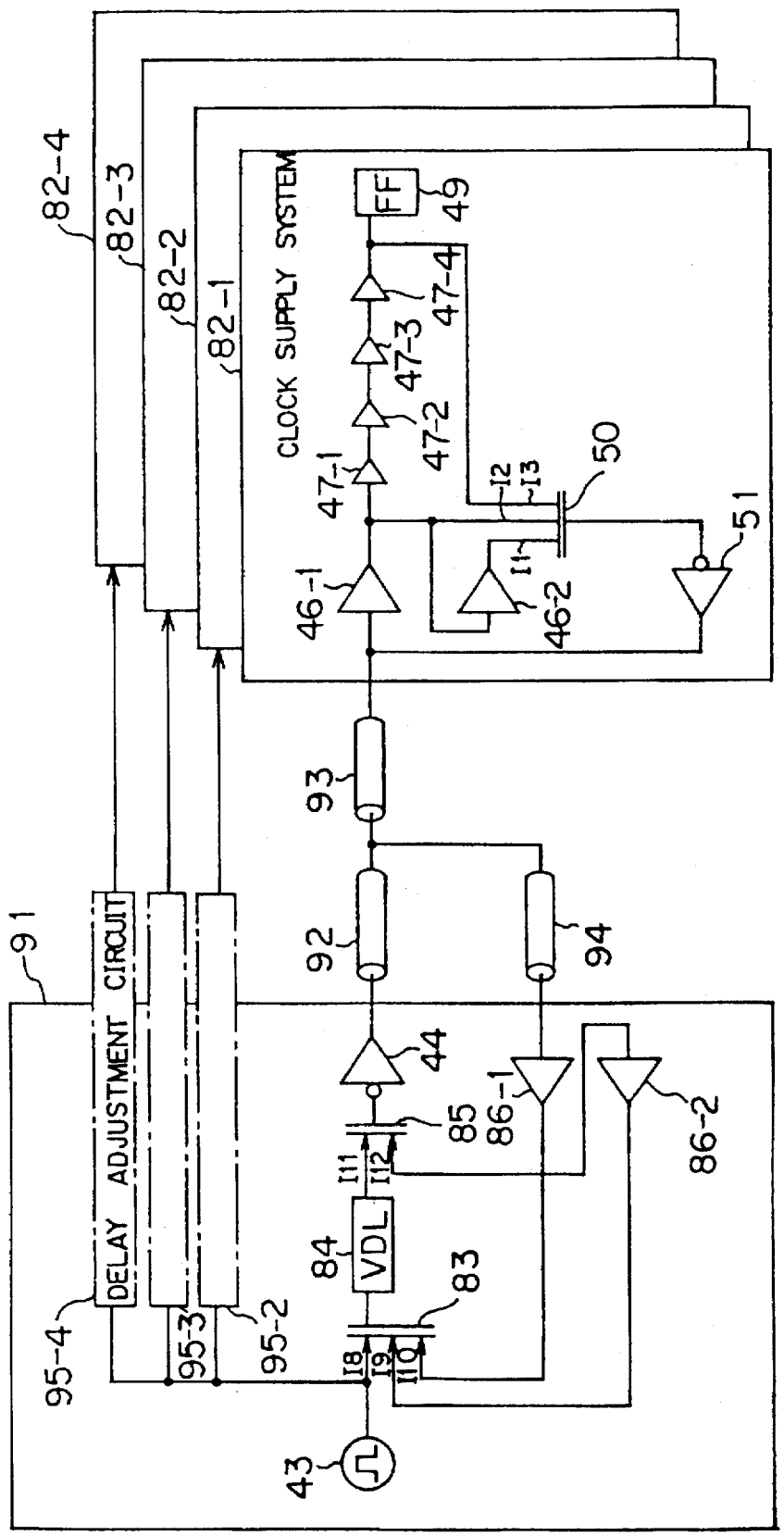
FIG. 11 is a block diagram illustrating a digital system using a skew adjustment apparatus, pursuant to a fifth embodiment of this invention.

Although in the fourth embodiment, a propagation delay time Tw of inter-circuit wiring 45 is obtained e.g. by using a TDR technique, it is possible to obtain the same by a skew adjustment apparatus of this invention e.g. without using a TDR technique. FIG. 11 shows such an embodiment.

FIG. 11 is a block diagram illustrating a digital system using a skew adjustment apparatus, pursuant to a fifth embodiment of this invention.

A digital system shown in FIG. 11 comprises a clock supply circuit 91 and clock reception circuits 82-1, 82-2, 82-3 and 82-4. Circuits shown in FIG. 11, which are the same as circuits shown in FIG. 8, have the same reference numbers. The configurations of clock reception circuits 82-1, 82-2, 82-3 and 82-4 are the same as those shown in FIG. 8.

Clock supply circuit 91 has a configuration basically identical to that of clock supply circuit 81 shown in FIG. 8, except that an inter-circuit wiring 92 connected to an output terminal of output buffer circuit 44 branches into an inter-circuit wiring 93 and an inter-circuit wiring 94. Inter-circuit wiring 94 is connected to an input terminal of an input buffer circuit 86-1. Meanwhile, inter-circuit wiring 93 is connected to an input terminal of input buffer circuit 46-1 of a clock reception circuit 82-1. Inter-circuit wirings 92 and 93 correspond to inter-circuit wiring 45 shown in FIG. 8.

In the fifth embodiment, inter-circuit wirings 92, 93 and 94 are manufactured, with their respective electrical lengths adjusted, such that a clock signal passing through wirings between respective circuit modules has the same propagation delay time. For instance, when inter-circuit wirings 92, 93 and 94 are manufactured by using wiring materials having an identical unit-length electrostatic capacitance, inter-circuit wirings 92, 93 and 94 need only have the same wiring length.

By equalizing the electrical lengths of inter-circuit wirings 92, 93 and 94, a sum of the signal delay times of inter-circuit wirings 92 and 93 between clock supply circuit 91 and clock reception circuit 82-1 is nearly equal to a sum of the signal delay times of inter-circuit wirings 92 and 94 between an output terminal of output buffer circuit 44 and an input terminal of input buffer circuit 86-1. In the fifth embodiment, as explained below, a sum of propagation delay times of inter-circuit wirings 92 and 94 is includable in a measured object, which sum may be obtained in lieu of a propagation delay time of wiring between clock supply circuit 91 and clock reception circuit 82-1. A propagation delay time of an inter-circuit wiring may be included in a skew adjustment e.g. without using a TDR technique.

Each of delay adjustment circuits 95-2, 95-3 and 95-4 has a configuration similar to that of a delay adjustment circuit comprising selector 83, VDL 84, selector 85, output buffer circuit 44, inter-circuit wirings 92 and 94, and input buffer circuits 86-1 and 86-2.

In the ordinary operating mode, as with the fourth embodiment, an output status setting signal (not shown) sets output buffer circuit 44 to a low impedance state and output buffer circuit 51 to a high impedance state, and a selection signal (not shown) has selector 83 select input terminal I8 and selector 85 select input terminal I11. At this time, flip-flop 49 receives at its clock input terminal a clock signal via a clock supply path comprising selector 83, VDL 84, selector 85, output buffer circuit 44, inter-circuit wirings 92 and 93, input buffer circuit 46-1 and buffers 47-1, 47-2, 47-3 and 47-4.

As well, the output status setting signal and the selection signal respectively set delay adjustment circuits 95-2, 95-3 and 95-4 as well as clock reception circuits 82-2, 82-3 and 82-4 to the ordinary operating mode in a similar manner. Delay adjustment circuits 95-2, 95-3 and 95-4 supply the clock signal to circuits (not shown) in clock reception circuits 82-2, 82-3 and 82-4 requiring a clock signal, respectively.

In the skew adjustment mode of the fifth embodiment, propagation delay time T10 of a circuit comprising buffers 47-1, 47-2, 47-3 and 47-4 in a clock reception circuit 82-1 and propagation delay time T11 of input buffer circuit 46-1 are obtained by using a procedure similar to that of the fourth embodiment.

Explained next is a method for measuring propagation delay times of a circuit in clock supply circuit 91 and inter-circuit wirings 92 and 94. In the fifth embodiment, as with in the fourth embodiment, the oscillating frequency of a ring oscillator is measured by a counter provided e.g. around an output terminal of output buffer circuit 44, around an input terminal of input buffer circuit 86-1, or in a clock supply circuit 91. Alternatively, the oscillating frequency of a ring oscillator may be measured by providing a test terminal at a point connecting inter-circuit wiring 92 to inter-circuit wiring 94.

First, the output status setting signal sets output buffer circuit 44 to a low impedance state and output buffer circuit 51 and input buffer circuit 46-1 to a high impedance state.

Second, the selection signal has selector 85 select an input terminal I12, for obtaining a propagation delay time T16 of a loop circuit comprising selector 85, output buffer circuit 44, inter-circuit wirings 92 and 94, and input buffer circuit 86-1.

Third, the selection signal has selector 85 select an input terminal I11 and selector 83 select an input terminal I10, for obtaining a propagation delay time T17 of a loop circuit comprising selector 83, VDL 84, selector 85, output buffer circuit 44, inter-circuit wirings 92 and 94, and input buffer circuit 86-1.

Fourth, the selection signal has selector 85 select an input terminal I11 and selector 83 select an input terminal I9, for obtaining a propagation delay time T18 of a loop circuit comprising selector 83, VDL 84, selector 85, output buffer circuit 44, inter-circuit wirings 92 and 94 and input buffer circuits 86-1 and 86-2.

Fifth, by subtracting propagation delay time T17 from propagation delay time T18, a propagation delay time of input buffer circuit 86-2, i.e. propagation delay time T13 of input buffer circuit 86-1 is obtained.

Sixth, by subtracting a propagation delay time T13 of input buffer circuit 86-1 from a propagation delay time T16, for obtaining a propagation delay time T19 of a circuit comprising selector 85, output buffer circuit 44, inter-circuit wirings 92 and 94. As described earlier, since inter-circuit wiring 93 and inter-circuit wiring 94 have nearly equal propagation delay times, a propagation delay time T19 is regarded as a propagation delay time of a circuit comprising selector 85, output buffer circuit 44, inter-circuit wirings 92 and 93.

Seventh, by subtracting propagation delay time T13 and T19 from propagation delay time T17, propagation delay time T15 of a circuit comprising a selector 83 and VDL 84 is obtained.

Then, a sum of respectively obtained propagation delay times T10, T11, T15, and T19 is defined as a propagation delay time Ts2. Propagation delay time Ts2 represents a total propagation delay time over a clock supply path stretching from an input side of selector 83 via inter-circuit wirings 92 and 93 to an input side of flip-flop 49. In the fifth embodiment, unlike the fourth embodiment, propagation delay time T19 obtained from the oscillating frequency of a ring oscillator includes a propagation delay time of a circuit comprising inter-circuit wirings 92 and 93.

In the skew adjustment mode, total propagation delay time Ts2 over each of clock supply paths for supplying a clock signal respectively to other clock reception circuits 82-2, 82-3 and 82-4 is obtained by using the same procedures shown in FIG. 9 and FIG. 10. Then, a propagation delay time a VDL generates is adjusted by changing control signals supplied to respective VDL's, such that the propagation delay time of any clock supply path falls within a tolerance range. In this adjustment, after changing control signal supplied e.g. to VDL 84, procedures are repeated as necessary, thereby readjusting e.g. VDL 84. This adjustment is repeated until the propagation delay time of any clock supply path falls within the tolerance range. The fifth embodiment enables a skew adjustment for the signal delay time of the entire clock supply path to be strictly performed only by a method for a ring oscillator without having to obtain separately a propagation delay time of an inter-circuit wiring.

Figure 12:
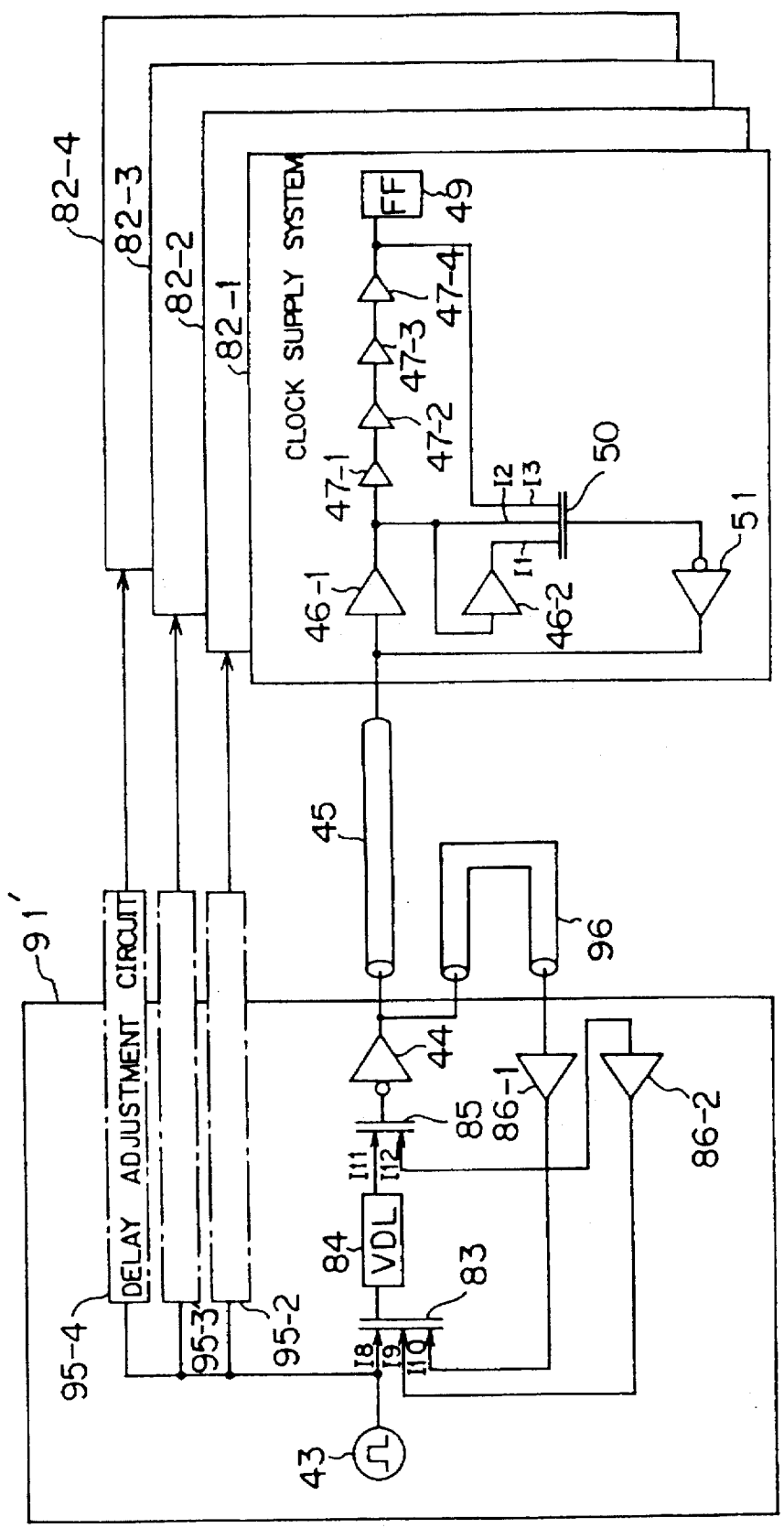
FIG. 12 is a block diagram illustrating a digital system using a skew adjustment apparatus, pursuant to a sixth embodiment of this invention.

FIG. 12 shows the configuration of the digital system, provided with the skew adjustment apparatus according to the sixth embodiment of the present invention. The digital system shown in FIG. 12 comprises the clock supply circuit 91 and the clock reception circuits 82-1, 82-2, 82-3, and 82-4. The reference numbers of the circuits shown in FIGS. 8 and 11 are assigned in common to the same circuits in FIG. 12. The configurations of the clock reception circuits 82-1, 82-2, 82-3, and 82-4 shown in FIG. 12 are the same as those shown in FIG. 11.

Since the procedures of operating the skew adjustment apparatus of the sixth embodiment and of calculating the delay time are similar to the fifth embodiment, described below are only the difference between the fifth and sixth embodiments.

The clock supply circuit 91' has basically the same configuration as the clock supply circuit 91 shown in FIG. 11. The difference in configuration between the circuits shown in FIGS. 11 and 12 is that the inter-circuit wiring 45 is not branched, but the inter-circuit wiring 96 is mounted additionally. The signal delay time of the inter-circuit wiring 96 is set equal to that of the inter-circuit wiring 45. As explained in the descriptions of the fifth embodiment, the signal delay time of the inter-circuit wiring 45 and the inter-circuit wiring 96 can be equal to each other by properly adjusting the electrical length of the inter-circuit wiring 45 and 96.

According to the fifth embodiment, the propagation delay time of the inter-circuit wiring 92 and 93 can be skew-adjusted by setting the sum of the propagation delay times of the inter-circuit wiring 92 and 93 equal to the sum of the propagation delay times of the inter-circuit wiring 92 and 94. However, since the delay time is equal between the inter-circuit wiring 45 and 96 according to the sixth embodiment, the skew adjustment can be attained by replacing the propagation delay time of the inter-circuit wiring 45 directly with the propagation delay time of the inter-circuit wiring 96.

As shown in FIG. 11, the delay adjustment circuits 95-2, 95-3, and 95-4 have the same configuration as the delay adjustment circuit comprising the selector 83, VDL 84, selector 85, output buffer circuit 44, inter-circuit wiring 96, and input buffer circuits 86-1 and 86-2.

The operation in a normal operation mode is the same as that according to the fifth embodiment. That is, the output buffer circuit 44 is set in a low impedance state and the output buffer circuit 51 is set in a high impedance state according to the output state setting signal not shown in the drawings. The input terminal I8 of the selector 83 and the input terminal I11 of the selector 85 are selected according to the selection signal not shown in the drawings. Thus, the clock signal is supplied to the clock input terminal of the flipflop 49.

The delay adjustment circuits 95-2, 95-3, and 95-4 and the clock reception circuits 82-2, 82-3, and 82-4 are set in the normal operation mode as in the fifth embodiment.

According to the procedure similar to that of the fifth embodiment, the delay times T10 and T11 are calculated and then T16, T17, and T18 are obtained, thereby calculating a total delay time Ts2 in the skew adjustment mode.

That is, according to the output state setting signal not shown in the drawings, the output buffer circuit 44 is set in a low impedance state and the output buffer circuit 51 is set in a high impedance state. Thus, a loop circuit is generated including the inter-circuit wiring 96 at the delay time measurement at the clock supply circuit 91'. Therefore, the delay time Ts2 obtained in the procedure similar to that of the fifth embodiment contains the propagation delay time of the inter-circuit wiring 96.

Since the propagation delay time of the inter-circuit wiring 96 is almost equal to the propagation delay time of the inter-circuit wiring 45, the delay time Ts2 is equivalent to the delay time containing that of the inter-circuit wiring 45, thereby successfully calculating the delay time of the entire clock supply path.

According to the sixth embodiment, it is not necessary to divide the inter-circuit wiring into the wiring 92 and 93 as in the fifth embodiment or make the sum of the propagation delay time of the inter-circuit wiring 92 and 93 equal to the sum of the delay time of the inter-circuit wiring 92 and 94. According to the sixth embodiment, only mounting the inter-circuit wiring 96 having the propagation delay time equal to that of the inter-circuit wiring 45 to the clock supply circuit 91' realizes the skew adjustment in a simple configuration.

Although a VDL is provided in a clock supply circuit in the fourth, fifth and sixth embodiments, as with the first embodiment, it can be provided in any clock reception circuit. In this case as well, the same procedure as in the fourth, fifth or sixth embodiment enables a skew of the entire clock supply path to be adjusted.

Figure 13:
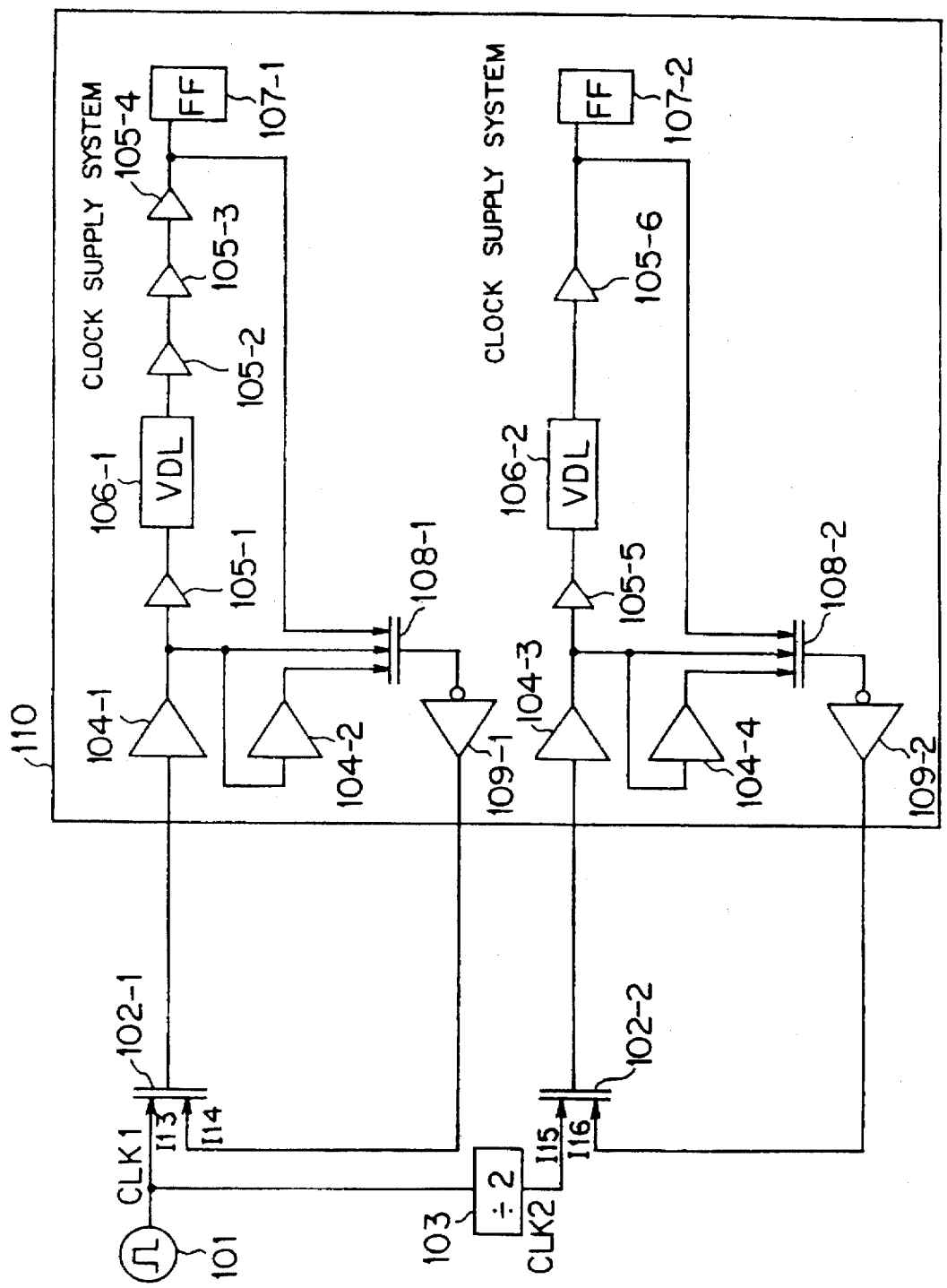
FIG. 13 is a block diagram illustrating a digital system using a skew adjustment apparatus, pursuant to a seventh embodiment of this invention.

As described above, although from the first to sixth embodiments assume that a plurality of signal supply paths targeted for a skew adjustment transfer the same clock signal, this invention is equally applicable to a skew adjustment of a plurality of signal supply paths for transferring a timing signal. FIG. 13 shows an embodiment of a skew adjustment apparatus for adjusting the skews of propagation delay times over supply paths of two kinds of clock signals having different frequencies.

FIG. 13 is a block diagram illustrating a digital system using a skew adjustment apparatus, pursuant to a seventh embodiment of this invention.

A clock oscillator 101, selectors 102-1 and 102-2 and a divider 103 shown in FIG. 13 and provided in a clock supply circuit (not shown) supply clock signals CLK1 and CLK2 to a clock reception circuit 110. The clock oscillator 101 generates clock signal CLK1 having a frequency 2f, and inputs it into an input terminal I13 of selector 102-1 and the divider 103. The divider 103 divides clock signal CLK1, generates clock signal CLK2 having a frequency f synchronized with a clock signal CLK1, and inputs clock signal CLK2 into an input terminal I15 of selector 102-2. Selectors 102-1 and 102-2 receive a mode switch signal (not shown). The mode switch signal has selector 102-1 select an input terminal I13 or I14 for an output of a signal received therefrom, and a selector 102-2 select an input terminal I15 or I16 for an output of a signal received therefrom.

A clock reception circuit 110 integrated in one LSI chip has a flip-flop 107-1 operating by clock signal CLK1 and a flip-flop 107-2 operating by clock signal CLK2. The configuration of a skew adjustment apparatus comprising e.g. a clock supply system and return path in a clock reception circuit 110 connected to flip-flop 107-1 is similar to that of the first embodiment shown in FIG. 3. As well, the configuration of a skew adjustment apparatus connected to flip-flop 107-2 is similar to that of the first embodiment shown in FIG. 3. Here, an output terminal of output buffer circuits 109-1 and 109-2 is connected via selectors 102-1 and 102-2 to an input terminal of input buffer circuits 104-1 and 104-3, respectively.

In the ordinary operating mode, the mode switch signal has a selector 102-1 select an input terminal I13 and a selector 102-2 select an input terminal I15. Thus, a flip-flop 107-1 receives at its clock input terminal clock signal CLK1 via a clock supply path comprising selector 102-1, input buffer circuit 104-1, VDL 106-1, and buffers 105-1, 105-2, 105-3 and 105-4. As well, a flip-flop 107-2 receives at its clock input terminal clock signal CLK2 via a clock supply path comprising a selector 102-2, input buffer circuit 104-3, VDL 106-2, and buffers 105-5 and 105-6.

Of the clock supply paths for clock signals CLK1 and CLK2, since inter-circuit wirings stretching from the clock supply circuit to clock reception circuit 110 generally have short distance between their respective origins and between their respective terminuses, it is easy to equalize their wiring lengths. Consequently, it is comparatively easy to set the electrical length of inter-circuit wiring for clock signal CLK1 equal to that of inter-circuit wiring for clock signal CLK2. However, in clock reception circuit 110, which is an LSI chip, because clock signals CLK1 and CLK2 have different clock supply system topologies, and are connected to different loads, propagation delay times of both clock supply systems for clock signals CLK1 and CLK2 generally do not match. Thus, in the seventh embodiment, a skew adjustment is performed for a clock supply system in clock reception circuit 110.

In the skew adjustment mode, the mode switch signal has selector 102-1 select an input terminal I14 and selector 102-2 to select an input terminal I16. Thus, each of two types of return paths of skew adjustment apparatuses shown in FIG. 13 are connected to input buffer circuits 104-1 and 104-3, respectively, thereby enabling a propagation delay time to be measured by a ring oscillator method.

First, a selection signal (not shown) has a selector 108-1 sequentially select three input terminals, thereby forming three types of ring oscillators. As with the first embodiment, a propagation delay time T20 of a clock supply system comprising input buffer circuit 104-1, VDL 106-1, and buffers 105-1, 105-2, 105-3 and 105-4 is obtained. At this time, although a propagation delay time of each ring oscillator includes a propagation delay time of selector 102-1, the inter-circuit wiring between the clock supply circuit and clock reception circuit 110, etc., in lieu of a propagation delay time of external wiring 52 shown in FIG. 3, because these are offset by subtractions, a propagation delay time T20 does not include them.

Next, the selection signal has selector 108-2 sequentially select three input terminals, for obtaining in the same procedure a propagation delay time T21 of a clock supply system comprising input buffer circuit 104-3, VDL 106-2, and buffers 105-5 and 105-6. Then, propagation delay times of VDL's 106-1 and 106-2 are adjusted, such that propagation delay times T20 and T21 are ultimately equalized. Such an adjustment enables clock signals CLK1 and CLK2 to arrive at respective input terminals of flip-flops 107-1 and 107-2 at the same timing in the ordinary operating mode.

A skew adjustment apparatus pursuant to the seventh embodiment enables an error in two kinds of clock signals, having different frequencies, caused by an output buffer circuit of a return path to be excluded, hence, the skew of a propagation delay time to be strictly adjusted. In the seventh embodiment, although a division of clock signal CLK1 produces clock signal CLK2, a similar skew adjustment can performed for not only a clock signal but also a plurality of generic timing signals having different phases and frequencies.

Figure 14:
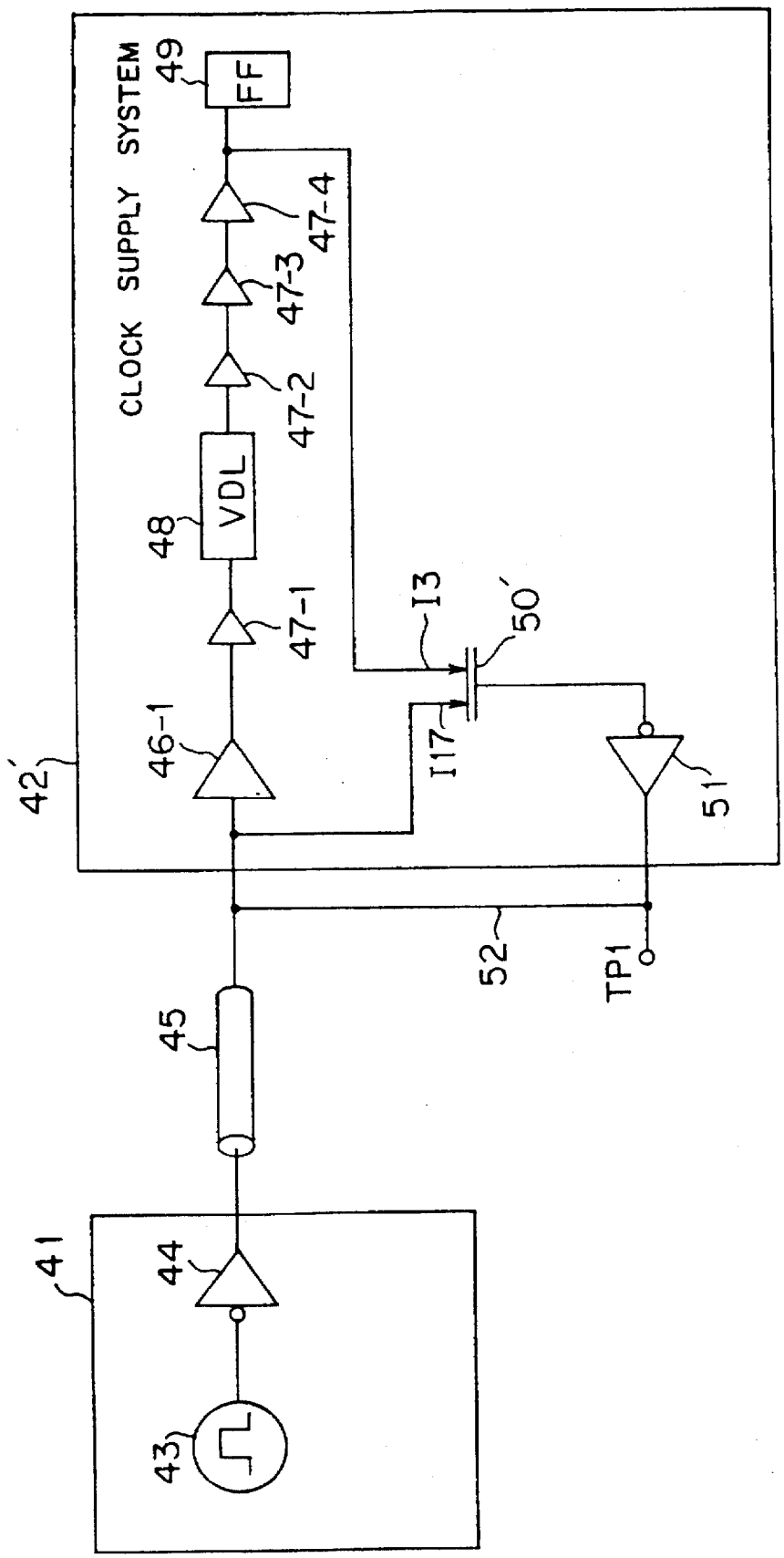
FIG. 14 is a block diagram illustrating a digital system using a skew adjustment apparatus, pursuant to an eighth embodiment of this invention.

FIG. 14 is a block diagram illustrating a digital system using a skew adjustment apparatus, pursuant to a eighth embodiment of this invention.

A digital system shown in FIG. 14 comprises clock supply circuit 41 and a clock reception circuit 42'. Circuits shown in FIG. 14, which are the same as circuits shown in FIG. 3, have the same reference numbers. Each of clock supply circuit 41 and clock reception circuit 42' corresponds to one LSI chip.

Clock reception circuit 42' shown in FIG. 14 has the same configuration as that of reception circuit 42 shown in FIG. 3, except that a selector 50' of a 2-input/1-output type has an input terminal I17 connected to the side of the clock supply circuit 41 of input buffer circuit 46-1.

A principle of the measurement of a propagation delay time in this embodiment is basically the same as those of other embodiments, which is as follows:

First, an output status setting signal (not shown) sets output buffer circuit 44 to a high impedance state and output buffer circuit 51 to a low impedance state.

Second, a selection signal (not shown) has selector 50' select an input terminal I3, for obtaining a propagation delay time of a loop circuit comprising input buffer 46-1, VDL 48, buffers 47-1 through 47-4, selector 50', output buffer circuit 51 and external wiring 52, by forming them into a ring oscillator. From the oscillating frequency of this ring oscillator, the signal delay time for one round of the closed loop is obtained as in the case of the first embodiment shown in FIG. 3.

Further, the selection signal has selector 50' select an input terminal I17, for obtaining the signal delay time for one round of a closed loop comprising output buffer 51 and external wiring 52. By subtracting the signal delay time obtained here from the signal delay time for one round of the closed loop including VDL 48, which is obtained earlier, a required signal delay time is obtained. The use of this signal delay time enables a skew to be precisely adjusted.

The eighth embodiment enables the signal delay time over a clock supply path stretching from input buffer circuit 46-1 to buffer 47-4 of a clock supply system to be obtained directly as the difference in the signal delay times between the large and small loops. Hence, the eighth embodiment does not require a dummy circuit or the like as in the second and third embodiments, in addition to enabling a precise signal delay time to be obtained more simply.

By the way, as is evident from FIG. 14, because in the eighth embodiment selector 50' has an input terminal I17 connected directly to inter-circuit wiring 45, selector 50' receives directly at an input terminal I17 a clock signal or any other timing signals passing through inter-circuit wiring 45 in the ordinary operating mode.

However, because selector 50' is an LSI-forming circuit element, it is prone to a destruction. More specifically, an application of a high voltage or a large current to inter-circuit wiring 45 or external wiring 52 causes selector 50' to be destroyed. As such, an LSI chip generally has input buffer circuit at an input terminal and output buffer circuit at an output terminal for an interface with the outside, such that all LSI-forming circuit elements exchanges a clock signal or any other timing signals through either input buffer circuit or output buffer circuit with the outside. Consequently, all the seven embodiments described above assume a configuration in which a selector is connected via an input buffer to the outside.

Even so, when selector 50' has enough toughness against an input signal from the outside, the eighth embodiment is still effective, enabling a simple configuration to precisely adjust a signal delay time and a skew.

It must be noted here that all the eight embodiments assume a configuration of measuring a propagation delay time from the oscillating frequency of a ring oscillator. As described earlier, upon obtaining a propagation delay time by using the oscillating frequency of a ring oscillator, every selected loop circuit must be configured to have an odd number of inverters for enabling an oscillation. Assume here, for example, there is a circuit in FIG. 14 having an inverter connected between buffer 47-1 and VDL 48. In this case, when the selection signal has selector 50' select input terminal I17, a closed loop comprising only external wiring 52 and output buffer 51 satisfies a oscillating condition for a ring oscillator.

That is, such a closed loop includes just one circuit element (output buffer circuit 51) functioning as an inverter. Still, a closed loop formed when the selection signal has selector 50' select input terminal I3 does not satisfy an oscillating condition for a ring oscillator. More specifically, because an inverter is provided between buffer 47-1 and VDL 48, the closed loop has two circuit elements each functioning as an inverter. Despite the necessity for such a consideration for a circuit configuration, this invention does not limit the freedom in the circuit configuration but allows one of ordinary skill in the art to exercise his discretion.

As described above, this invention enables a digital circuit operating by using various timing signals to eliminate a propagation delay time over return path from a propagation delay time of a ring oscillator comprising a supply path of the timing signal and a return path. Accordingly, this invention enables a variation in return path characteristics mixed as an error in a propagation delay time of a supply path obtained by a conventional skew adjustment method to be eliminated and a propagation delay time over a supply path of a timing signal to be obtained precisely. Especially, since a variation in propagation delay times of output buffer circuits for driving a wiring part on a return path is large, it is advantageous to eliminate the variation from the propagation delay times of ring oscillators.

As well, mutual comparisons of propagation delay times obtained for a plurality of supply paths enable skews among the plurality of supply paths to be strictly adjusted.

In addition, because this invention enables a digital circuit using a high frequency clock signal to strictly adjust skews over clock supply paths, it has an advantage in simplifying a high speed digital circuit necessitated by a clock signal having a higher frequency.

Although this invention has been described in its preferred forms with a certain degree of particularity, it is understood that the present disclosure of the preferred forms has been changed in details of construction and that the combination and arrangement of parts may be restored to without departing from the spirit and the scope of this invention as hereinafter claimed.

What is claimed is:

1. A skew adjustment apparatus for use in a digital system having a timing signal supply path for supplying a timing signal to a digital circuit, comprising:

first delay means provided on the timing signal supply path;

propagation delay time adjustment means provided on the timing signal supply path for adjusting a propagation delay time of the timing signal supply path;

second delay means connected to an output terminal of said propagation delay time adjustment means and an input terminal of said first delay means; and selection means for selectively forming a first loop circuit operating as a ring oscillator, the first loop circuit including said first delay means said second delay means and said propagation delay time adjustment means the first loop circuit having a first propagation delay time, or a second loop circuit operating as a ring oscillator, the second loop circuit including said first delay means and said second delay means, the second loop circuit having a second propagation delay time.

2. The skew adjustment apparatus according to claim 1, wherein:

said propagation delay time adjustment means adjusts the propagation delay time of the timing signal based on a result obtained by subtracting the second propagation delay time from the first propagation delay time.

3. The skew adjustment apparatus according to claim 1, further comprising:

third delay means connected to the timing signal supply path, said third delay means having a propagation delay time equivalent to the propagation delay time of said first delay means, wherein:

said selection means selectively forms one of the first loop circuit, the second loop circuit, and a third loop circuit including said first delay means, said second delay means and said third delay the third loop circuit having a third propagation delay time.

4. The skew adjustment apparatus according to claim 3, wherein:

said propagation delay time adjustment means adjusts the propagation delay time of the timing signal supply path based on a difference obtained by subtracting a propagation delay time of said second delay means from the first propagation delay time, through an operation using the first propagation delay time, the second propagation delay time, and the third propagation delay time.

5. A skew adjustment apparatus for use in a digital system having a plurality of timing signal supply paths for supplying a timing signal to display circuits, the skew adjustment apparatus comprising:

a plurality of first delay means wherein a first delay means is provided on each of said plurality of timing signal supply paths;

a plurality of propagation delay time adjustment means, wherein a propagation delay time adjustment means is provided on each of said plurality of timing signal supply paths for adjusting a propagation delay time for each corresponding timing signal supply path;

a plurality of second delay means, wherein a second delay means is connected between each output terminal of a corresponding said propagation delay time adjustment means and an input terminal of a corresponding said first delay means; and a plurality of selection means, wherein a selection means is provided for each timing signal path for selectively forming a first loop circuit including said first and second delay means and said propagation delay time adjustment means or a second loop circuit including said first and second delay means.

6. A skew adjustment apparatus according to claim 5, further comprising, a plurality of third delay means each having a propagation delay time equivalent to that of said first delay means wherein each third delay means being connected to corresponding one of said plurality of timing signal supply paths, wherein:

each of said selection means selectively forms one of the first loop circuit, the second loop circuit, and a third loop circuit including said first, second and third delay means.

7. A skew adjustment apparatus for use in a digital system having a timing signal generation circuit for generating a timing signal generation circuit for generating a timing signal and a timing signal supply path for transferring the timing signal, comprising:

propagation delay time adjustment means provided on said timing signal supply path for adjusting a propagation time of the timing signal supply path;

first delay means provided on said timing signal supply path;

a first return path connected to said timing signal supply path;

second delay means provided on said first return path;

a second return path connected to said first return path;

third delay means, having a propagation delay time equivalent to a propagation delay time of said second delay means, provided on said second return path; and selection means for selectively forming a first loop circuit including said first and second delay means and said propagation delay time adjustment means or a second loop circuit including said first, second, third delay means and said propagation delay time adjustment means.

8. The skew adjustment apparatus according to claim 7, wherein:

said propagation delay time adjustment means adjusts a propagation delay time of said timing signal supply path based on a difference obtained by subtracting a propagation delay time of said second delay means from a propagation delay time of the first loop circuit, through an operation using a propagation delay time of the first loop circuit and a propagation delay time of the second loop circuit.

9. The skew adjustment apparatus according to claim 8, wherein:

said selection means selectively forms one of the first loop circuit, the second loop circuit and a third loop circuit including said first and second delay means.

10. The skew adjustment apparatus according to claim 9, wherein:

said propagation delay time adjustment means adjusts the propagation delay time over said timing signal supply path by subtracting a propagation delay time of said second delay means from a propagation delay time of the first loop circuit, through an operation using the propagation delay time of the first loop circuit, the propagation delay time of the second loop circuit, and a propagation delay time of the third loop circuit.

11. A skew adjustment apparatus for use in a digital system having a timing signal generation circuit for generating a timing signal and a plurality of timing signal supply paths for transferring the timing signal, comprising:

a plurality of propagation delay time adjustment means, wherein a propagation delay time is provided on each of said plurality of timing signal supply paths;

a plurality of first delay means, wherein a first delay means is provided on each of said plurality of timing signal supply paths;

a plurality of first return path, wherein a first return path is connected to each of said plurality of timing signal supply paths;

a plurality of second delay means, wherein a second delay means is provided on each of said first return path;

a plurality of second return path, wherein a second return path is connected to each of said first return path;

a plurality of third delay means, each having a propagation delay time equivalent to that of a corresponding said second delay means, wherein a third delay means is provided on each of said second return path; and a plurality of selection means provided for each timing signal supply paths, each selection means selectively forming a first loop circuit including corresponding ones of said first and second delay means and said propagation delay time adjustment means or a second loop circuit including corresponding ones of said first, second and third delay means and said propagation delay time adjustment means.

12. The skew adjustment apparatus according to claim 11, wherein:

each of said selection means selectively forms one of said first loop circuit, said second loop circuit, and a third loop circuit including corresponding ones of said first and second delay means.

13. A skew adjustment apparatus for use in a digital system having a timing signal supply path for supplying a timing signal to a digital circuit, comprising:

a variable delay line provided on the timing signal supply path;

a first input buffer circuit provided on the timing signal supply path;

a first return path connected to the timing signal supply path;

an output buffer circuit provided on said first return path;

a second return path connected to the timing signal supply path;

a second input buffer circuit, having a propagation delay time equivalent to a propagation delay time of said first input buffer circuit, provided on said second return path; and a selector for selectively forming one of a first loop circuit including said first input buffer circuit, said variable delay line and said output buffer circuit, a second loop circuit including said first input buffer circuit and said output buffer circuit, and a third loop circuit including said first and second input buffer circuits and said output buffer circuit.

14. A skew adjustment apparatus for use in a digital system having a timing signal generation circuit for generating a timing signal and a timing signal supply path for transferring said timing signal, comprising:

a variable delay line provided on the timing signal supply path;

an output buffer circuit provided on the timing signal supply path;

a first return path connected to the timing signal supply path;

a first input buffer circuit provided on said first return path;

a second return path connected to said first return path;

a second input buffer circuit, having a propagation delay time equivalent to a propagation delay time of said first input buffer circuits provided on said second return path; and a selector for selectively forming a first loop circuit including said output buffer circuit, said first input buffer circuit and said variable delay line or a second loop circuit including said output buffer circuit, said first and second input buffer circuits and said delay line.

15. A skew adjustment apparatus for use in a digital system having a plurality of timing signal supply paths for supplying a plurality of timing signals to digital circuits, comprising:

a variable delay line provided for each of the plurality of timing signal supply paths;

a first input buffer circuit provided on each of the plurality of timing signal supply paths;

a first return path connected to each of the plurality of timing signal supply paths;

an output buffer circuit provided on said first return path;

a second return path connected to each of the plurality of timing signal supply paths;

a second input buffer circuit, having a propagation delay time equivalent to a propagation delay time of said first input buffer circuit, provided on said second return path; and a selector for selectively forming one of a first loop circuit including said first input buffer circuit and said variable delay line and said output buffer circuit, a second loop circuit including said first input buffer circuit and said output buffer circuit, and a third loop circuit including said first and second input buffer circuits and said output buffer circuit.

16. A skew adjustment apparatus for use in a digital system having a plurality timing signal supply path for supplying a timing signal to a plurality of digital circuit, comprising:

a variable delay line provided for each of the plurality of timing signal supply paths;

an input buffer circuit provided for each of the plurality of timing signal supply paths:

a first return path connected to said plurality of timing signal supply paths;

an output buffer circuit provided on said first return path;

a second return path connected to each of said plurality of timing signal supply paths; and a selector for selectively forming a first loop circuit including said input buffer circuit, said variable delay line and said an output buffer circuit or a second loop circuit including said output buffer circuit.

17. A propagation delay time measurement apparatus for use in a digital system having a timing signal supply path for supplying a timing signal to a digital circuit comprising:

first delay means provided on the timing signal supply path;

propagation delay time adjustment means provided on the timing signal supply path;

second delay means, connected between an output terminal of said propagation delay time adjustment means and an input terminal of said first delay means; and selection means for selectively forming a first loop circuit including said first and said second delay means and said propagation delay time adjustment means or a second loop circuit including said first and said second delay means, and wherein:

a propagation delay time of a part of said timing signal supply path is detected by subtracting a propagation delay time of the second loop circuit from a propagation delay time of the first loop circuit.

18. The propagation delay time measurement apparatus according to claim 17, further comprising third delay means, having a propagation delay time equivalent to a propagation delay time of said first delay means, connected to said timing signal supply path, wherein:

said selection means selectively forms one of said first loop circuit, said second loop circuit, and a third loop circuit including said first, second and third delay means; and wherein:

a propagation delay time of said second delay means is subtracted from a propagation delay time of said first loop circuit through an operation using a propagation delay time of the first loop circuit, a propagation delay time of the second loop circuit, and a propagation delay time of the third loop circuit.

19. A propagation delay time measurement apparatus for use in a digital system having a timing signal generation circuit for generating a timing signal and a timing signal supply path for transferring said timing signal, comprising:

propagation delay time adjustment means provided on the timing signal supply path;

first delay means provided on the timing signal supply pat;

second delay means provided on said first return path;

a second return path connected to said first return path;

third delay means, having a propagation delay time equivalent to a propagation delay of said second delay means, provided on said second return path; and selection means for selectively forming a first loop circuit including said first and second delay means and said propagation delay time adjustment means or a second loop circuit including said first, second, and third delay means and said propagation delay time adjustment means, and wherein:

a propagation delay time of a part of said timing signal supply path is obtained, by subtracting a propagation delay time of said second delay means from a propagation delay time of the first loop circuit, through an operation using a propagation delay time of the first loop circuit and a propagation delay time of the second loop circuit.

20. The propagation delay time measurement apparatus according to claim 19, wherein:

said selection means selectively form one of said first loop circuit, said second loop circuit, and a third loop circuit including said first and second delay means; and wherein:

a propagation delay time of said second delay means is subtracted from a propagation delay time of the first loop circuit, through an operation using a propagation delay time of the first loop circuit, a propagation delay time of the second loop circuit, and a propagation delay time of the third loop circuit.

21. A skew adjustment method for adjusting a signal delay time over a timing signal supply path which supplies a timing signal to a digital circuit, the method comprising the steps of:

forming a first loop circuit including a first delay circuit and a variable delay line on the timing signal supply path, and a second delay circuit not on the timing signal supply path;

obtaining a propagation delay time of the first loop circuit by emitting a first pulse that said first loop circuit oscillates;

forming a second loop circuit including the first and second delay circuits;

obtaining a propagation delay time of the second loop circuit by emitting a second pulse that said second loop circuit oscillates; and adjusting a signal delay time over the timing signal supply path, by changing a propagation delay time of the variable delay line, based on the propagation delay time of the first loop circuit and the propagation delay time of the second loop circuit.

22. The skew adjustment method according to claim 21, further comprising the steps of:

forming a third loop circuit including a third delay circuit, having a propagation delay time equivalent to a propagation delay time of the first delay circuit, and the first and second delay circuits, the third delay circuit not being on said timing signal supply path;

obtaining a propagation delay time of the third loop circuit by emitting a third pulse that said third loop circuit oscillates; and adjusting the signal delay time over the timing signal supply path by changing a propagation delay time of the variable delay line, based on the propagation delay time of the first loop circuit, the propagation delay time of the second loop circuit, and the propagation delay time of the third loop circuit.

23. A skew adjustment method for adjusting a signal delay time over a timing signal supply path which supplies a timing signal to a digital circuit, the method comprising the steps of:

forming a first loop circuit including a first delay circuit, a variable delay line on the timing signal supply path and a second delay circuit not on said timing signal supply path;

obtaining a propagation delay time of the first loop circuit by emitting a first pulse that the first loop circuit oscillates;

forming a second loop circuit including the first and second delay circuits, the variable delay line and a third delay circuit, having a propagation delay time equivalent to a propagation time of the first delay circuit, not provided on the timing signal supply path;

obtaining a propagation delay time of said second loop circuit by emitting a second pulse that the second loop circuit oscillates; and adjusting a signal delay time of the timing signal supply path by changing a propagation delay time of the variable delay line, based on the propagation delay time of the first loop circuit and the propagation delay time of the second loop circuit.

24. A skew adjustment method for adjusting a signal delay time of a timing signal supply path which supplies a timing signal to a digital circuit, the method comprising the steps of:

forming a first loop circuit from the timing signal supply path and a return path;

obtaining a propagation delay time of the first loop circuit by emitting a first pulse that the first loop circuit oscillates;

forming a second loop circuit using the return path;

obtaining a propagation delay time of the second loop circuit by emitting a second pulse that the second loop circuit oscillates;

obtaining a signal delay time of the timing signal supply path using the propagation delay time of the first loop circuit and the propagation delay time of the second loop circuit; and adjusting the signal delay time of the timing signal supply path, based on the obtained signal delay time of the timing signal supply path.

25. The skew adjustment method according to claim 24, further comprising the steps of:

forming a third loop circuit using the return path;

obtaining a propagation delay time of the third loop circuit by emitting a third pulse that the third loop circuit oscillates;

obtaining the signal delay time of the timing signal supply path using the propagation delay time of the first loop circuit, the propagation delay time of the second loop circuit, and the propagation delay time of the third loop circuit; and adjusting the signal delay time of the timing signal supply path, based on the obtained signal delay time over the timing signal supply path.

* * * * *

UNITED STATES PATENT AND TRADEMARK OFFICE
CERTIFICATE OF CORRECTION

PATENT NO. : 5,745,533

DATED : April 28, 1998

INVENTOR(S) : Asada et al.

Page 1 of 2

It is certified that error appears in the above-identified patent and that said Letters Patent is hereby corrected as shown below:

Title page, item [54] and Column 1,

--AN APPARATUS AND METHOD FOR ADJUSTING THE SKEW OF A TIMING SIGNAL USING PROPAGATION DELAY TIME OF SIGNALS GENERATED BY A RING OSCILLATOR FORMING A PART OF A DIGITAL CIRCUIT--.

Col. 25, line 55, "means" should be --means,--;

line 57, "means" should be --means,--.

Col. 28, line 47, "circuits" should be --circuit,--.

Col. 30, line 4, "pat" should be --path--.

Col. 7, line 25, delete "the" (second occurrence);

line 26, delete "the".

Col. 23, line 50, before "performed" insert --be--.

line 54, "a" (second occurrence) should be --an--.

UNITED STATES PATENT AND TRADEMARK OFFICE
CERTIFICATE OF CORRECTION

PATENT NO. : 5,745,533

DATED : April 28, 1998

INVENTOR(S) : Asada et al.

It is certified that error appears in the above-identified patent and that said Letters Patent is hereby corrected as shown below:

Col. 24, line 66, "a" should be --an--.

Col. 29, line 19, ":" should be --;--;

line 27, delete "an".

Col. 30, line 26, "form" should be --forms--.

Signed and Sealed this

Twelfth Day of January, 1999

Attest:

*Attesting Officer*       *Acting Commissioner of Patents and Trademarks*